USO10284553B2

(12) United States Patent
Morita et al.

(10) Patent No.: US 10,284,553 B2
(45) Date of Patent: May 7, 2019

(54) RELAY APPARATUS, TERMINAL APPARATUS, AND COMMUNICATION METHOD

(71) Applicant: RENESAS ELECTRONICS CORPORATION, Tokyo (JP)

(72) Inventors: Naoyuki Morita, Tokyo (JP); Tadaaki Tanimoto, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 251 days.

(21) Appl. No.: 14/985,242

(22) Filed: Dec. 30, 2015

(65) Prior Publication Data

US 2016/0219051 A1 Jul. 28, 2016

(30) Foreign Application Priority Data

Jan. 27, 2015 (JP) .................................. 2015-012877

(51) Int. Cl.
*H04L 29/06* (2006.01)
*H04L 9/32* (2006.01)

(52) U.S. Cl.
CPC ........ *H04L 63/0876* (2013.01); *H04L 9/3226* (2013.01); *H04L 63/0435* (2013.01); *H04L 63/0869* (2013.01)

(58) Field of Classification Search
CPC ..... G06F 21/31; G06F 21/577; H04L 63/083; H04L 63/0884
See application file for complete search history.

(56) References Cited

U.S. PATENT DOCUMENTS

| 6,463,474 B1 * | 10/2002 | Fuh ..................... H04L 63/0227 709/225 |
| 7,062,490 B2 | 6/2006 | Adya et al. |
| 7,484,008 B1 * | 1/2009 | Gelvin .................... H04L 67/12 709/249 |
| 8,195,935 B2 | 6/2012 | Tian et al. |

(Continued)

FOREIGN PATENT DOCUMENTS

| JP | H1188325 A | 3/1999 |
| JP | 2002-358226 A | 12/2002 |

(Continued)

OTHER PUBLICATIONS

D. Oshida et al., "Connected Vehicle Security" Computer Security Symposium 2014, Oct. 22-24, 2014, pp. 651-658.

(Continued)

*Primary Examiner* — Mohammed Waliullah
(74) *Attorney, Agent, or Firm* — McDermott Will & Emery LLP

(57) ABSTRACT

In a communication system in which a relay apparatus, a terminal apparatus, and other apparatuses, which can communicate with an authentication apparatus, are coupled through a communication path, the relay apparatus, and the terminal apparatus have unique authentication information, respectively. The relay apparatus transmits its own authentication information and authentication information collected from the terminal apparatus to the authentication apparatus. The authentication apparatus determines whether the relay apparatus and the terminal apparatus are authentic apparatuses based on the received authentication information. The relay apparatus shuts down communication between itself and an apparatus determined to be unauthentic based on a result of the determination, and transmits communication control information to shut down communication with the apparatus determined to be unauthentic to (Continued)

the terminal apparatus. The terminal apparatus shuts down the communication between itself and the apparatus determined to be unauthentic based on the communication control information.

20 Claims, 27 Drawing Sheets

(56) References Cited

U.S. PATENT DOCUMENTS

| | | | |
|---|---|---|---|
| 8,225,092 | B2 | 7/2012 | Lal et al. |
| 8,843,753 | B2 | 9/2014 | Yegin et al. |
| 9,509,687 | B2 * | 11/2016 | Kato .............. H04L 63/0853 |
| 2013/0318343 | A1 * | 11/2013 | Bjarnason .......... H04L 41/0809 713/157 |
| 2014/0157374 | A1 * | 6/2014 | Kato .............. H04L 63/0853 726/4 |

FOREIGN PATENT DOCUMENTS

| | | |
|---|---|---|
| JP | 2005-341253 A | 12/2005 |
| JP | 2008-530919 A | 8/2008 |
| JP | 2010-504670 A | 2/2010 |
| JP | 2013-200589 A | 10/2013 |
| JP | 2014-058224 A | 4/2014 |
| JP | 2014513349 A | 5/2014 |

OTHER PUBLICATIONS

Japanese Office Action issued in corresponding Japanese Patent Application No. 2015-012877, dated Jul. 24, 2018, with English Translation.

* cited by examiner

RELAY APPARATUS, TERMINAL APPARATUS, AND COMMUNICATION METHOD

CROSS-REFERENCE TO RELATED APPLICATIONS

The disclosure of Japanese Patent Application No. 2015-012877 filed on Jan. 27, 2015 including the specification, drawings and abstract is incorporated herein by reference in its entirety.

BACKGROUND

The present invention relates to a relay apparatus and a terminal apparatus that are coupled to an authentication apparatus through a communication path and a communication method. In particular, the present invention can be preferably used for authentication of the relay apparatus and the terminal apparatus.

In a hierarchically constructed system, it becomes more important to technically protect the system from attack which causes an illegal device to participate in the system. For example, a vehicle in which an in-vehicle network is mounted is configured to be able to couple to an external authentication server through a gateway and can receive authentication for the vehicle. However, even when an illegal device is coupled to the in-vehicle network, it is necessary to protect other authentic devices coupled to the in-vehicle network from attack performed by the illegal device.

Japanese Unexamined Patent Application Publication (Translation of PCT Application) No. 2014-513349 discloses a method of providing service by a machine to machine (M2M) device. The M2M device includes a transmitter that transmits a request for a first authentication including an authentication information to a network security unit (NSEC) and a controller that performs extensible authentication protocol (EAP) along with the transmitter, and further includes a key generator that generates a secret key by using at least one of a master session key (MSK) and the authentication information of the M2M device when the authentication has succeeded. Here, the NSEC representing the network security unit is an abbreviation of network security capability, the EAP is an abbreviation of extensible authentication protocol, and the MSK is an abbreviation of master session key.

Japanese Unexamined Patent Application Publication No. Hei 11(1999)-088325 discloses an authentication system that can protect information from falsification and leakage by providing a control manager having an authentication function based on Byzantine agreement and a verification/control function of covert channel in a network.

Japanese Unexamined Patent Application Publication No. 2002-358226 discloses a method of safely distributing and managing file systems by a plurality of computers. Safety is ensured by duplicating and storing a directory in a plurality of computers (Byzantine group) that form the Byzantine agreement and load is reduced by not using the Byzantine agreement although a file is duplicated and stored in a plurality of computers. Further, it is possible to verify that content of read file is correct by duplicating and storing a digest value of the content of the file in the Byzantine group.

SUMMARY

The inventors have studied Japanese Unexamined Patent Application Publication (Translation of PCT Application) No. 2014-513349, Japanese Unexamined Patent Application Publication No. Hei 11(1999)-088325, and Japanese Unexamined Patent Application Publication No. 2002-358226, and as a result the inventors have found that there are new problems as described below.

According to a technique described in Japanese Unexamined Patent Application Publication (Translation of PCT Application) No. 2014-513349, even when an M2M network does not directly communicate with a certificate authority, it is possible to securely deliver an authentication key to a gateway in a network so that apparatus authentication can be performed inside the network. Therefore, apparatuses are securely activated, and secure communication between apparatuses is realized. However, the authentication of the apparatus itself is not described. Therefore, it is not possible to exclude an illegal apparatus.

According to a technique described in Japanese Unexamined Patent Application Publication No. Hei 11(1999)-088325, it is possible to find falsification or leakage of information even when there is a possibility of falsification of data through a covert channel or there is a possibility that a system administrator in an authentication system acts wrong. However, it is not possible to exclude a system administrator who acts wrong and a general terminal that acts wrong.

According to a technique described in Japanese Unexamined Patent Application Publication No. 2002-358226, even when some of a plurality of computers are caused to be inaccessible at an arbitrary time to a file distributed to the plurality of computers, it is possible to store the file with high reliability and manage the file with an accessible method, and at the same time it is possible to prevent access from an unauthorized user. However, a method to exclude an illegal computer from a plurality of computers is not described.

In a system as described above, it is not possible to exclude an illegal device that performs a Byzantine fault type attack, in which the illegal device randomly performs an illegal behavior while the illegal device pretends to be a normal device. This is because it is generally assumed that a communication error occurs in a network in such a system, and a protocol is employed in which communication is assumed to be normal if a correct response is obtained while retry is repeated, so that once a mutual coupling authentication between devices is obtained in the network, it is not possible to distinguish the Byzantine fault type attack from an error on a communication path.

Further, for example, as described in Japanese Unexamined Patent Application Publication No. Hei 11(1999)-088325 and Japanese Unexamined Patent Application Publication No. 2002-358226, a technique is known in which influence of attack is reduced by making a decision by an entire council system on the premise that a malicious device is in a network by using the Byzantine agreement. However, it is not possible to exclude the malicious device itself. Further, when a ratio of malicious nodes in the entire system increases, it is not possible to prevent a situation such as a deterioration of calculation cost required for communication and an increase of failure rate of communication, and in the worst case, a system down occurs. In particular, if a system down occurs in an in-vehicle system, there is a risk that it may lead to a serious accident involving a human life, so that it is particularly serious.

While the means to solve the above problems will be described below, the other problems and new features will become clear from the description of the present specification and the accompanying drawings.

According to an embodiment, the means to solve the above problems is as described below.

A communication system in which a relay apparatus, a terminal apparatus, and other apparatuses, which can communicate with an authentication apparatus, are coupled through a communication path is configured as described below.

The relay apparatus, the terminal apparatus, and the other apparatuses respectively have unique authentication information. The relay apparatus transmits its own authentication information to the authentication apparatus. The relay apparatus collects authentication information from the terminal apparatus and the other apparatuses which are coupled to the communication path and transmits the authentication information to the authentication apparatus. The authentication apparatus has a function of apparatus authentication that determines whether or not the relay apparatus, the terminal apparatus, and the other apparatuses are authentic apparatuses based on the received authentication information.

The relay apparatus receives a result of the apparatus authentication from the authentication apparatus, shuts down communication between itself and an apparatus determined to be unauthentic based on the result, and transmits communication control information to the terminal apparatus and the other apparatuses to shut down communication with the apparatus determined to be unauthentic. The terminal apparatus and the other apparatuses shut down communication between themselves and the apparatus determined to be unauthentic based on the communication control information.

An effect obtained by the embodiment described above is as simply described below.

Even when an illegal apparatus that performs a Byzantine fault type attack is coupled to a communication path to which other apparatuses and a relay apparatus are coupled, it is possible to exclude the illegal apparatus from the communication path.

BRIEF DESCRIPTION OF THE DRAWINGS

FIG. 27 is an explanatory diagram showing an example in which a network having a general graph structure shown in FIG. 26 is formed by a breadth-first search or the like.

DETAILED DESCRIPTION

Embodiments will be described in detail.

First Embodiment <Basic Concept>

Figure 1:
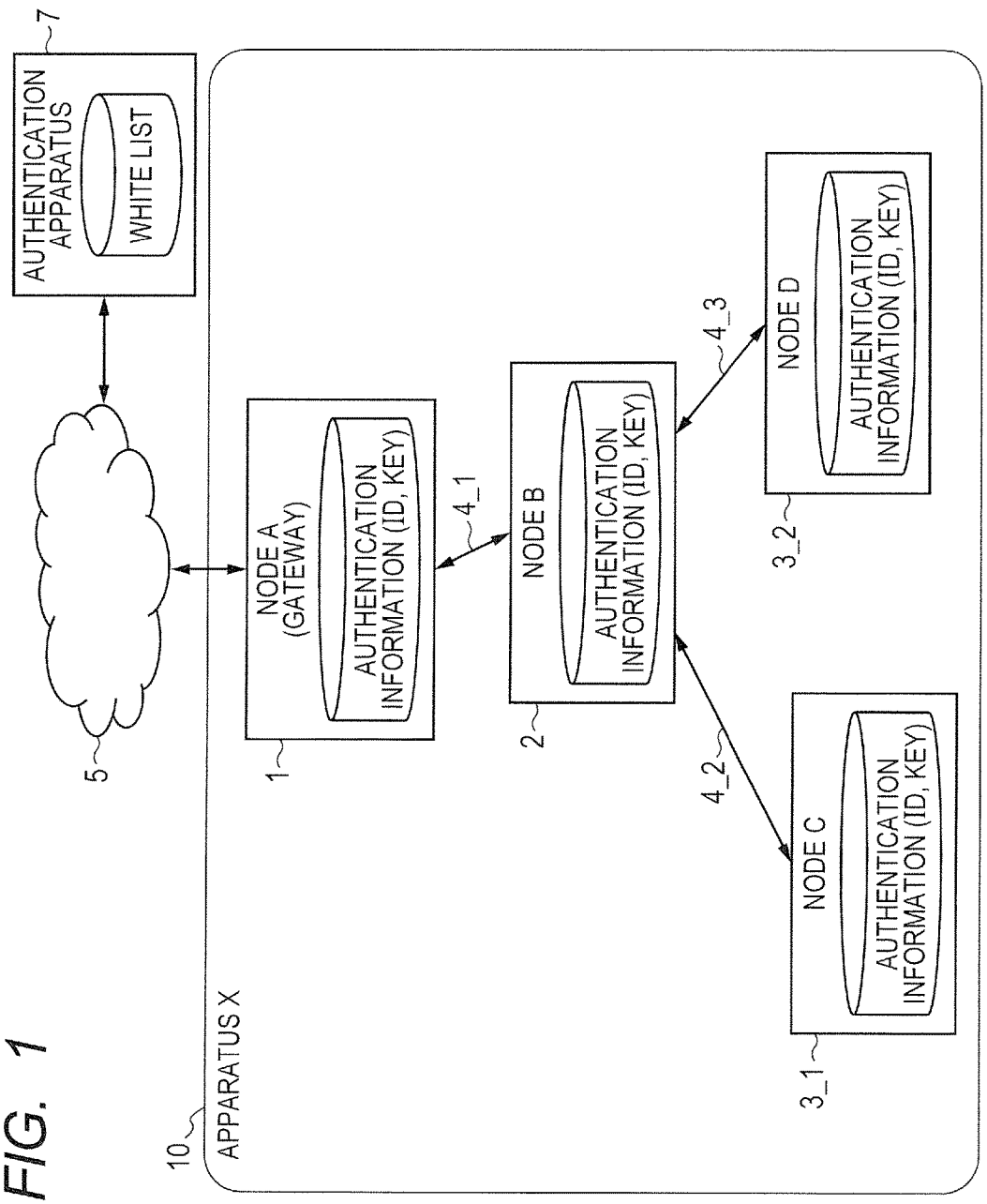
FIG. 1 is a block diagram showing a basic configuration.

FIG. 1 is a block diagram showing a basic configuration. An apparatus (X) 10 includes nodes (A to D) 1, 2, 3_1, and 3_2, which are a plurality of apparatuses that can communicate with each other by communication paths 4_1 to 4_3. The apparatus (X) can communicate with an authentication apparatus 7 from the node (A) functioning as a gateway through an external network 5. Regarding a relay apparatus and terminal apparatuses according to a basic embodiment, a relay apparatus (node B) 2 that can communicate with the authentication apparatus 7, terminal apparatuses (nodes C and D) 3_1 and 3_2, and the other apparatus (node A) 1 are configured as described below in a communication system coupled through the communication paths 4_1 to 4_3. The relay apparatus (node B) 2 can communicate with the authentication apparatus 7 coupled to the external network 5 through the upper gateway node A (1). A communication medium need not necessarily be a network, and any communication medium can be used.

Each of the relay apparatus (node B) 2, the terminal apparatuses (nodes C and D) 3_1 and 3_2, and the other apparatus (node A) 1 has unique authentication information. The authentication apparatus 7 has a function of apparatus authentication for determining whether or not each of the relay apparatus (node B) 2, the terminal apparatuses (nodes C and D) 3_1 and 3_2, and the other apparatus (node A) 1 is an authentic apparatus based on authentication information of each apparatus. The authentication apparatus 7 holds a list of devices that behave normally, that is, a white list. Here, the unique authentication information is information for verifying that each apparatus is authentic. The unique authentication information is, for example, a unique identifier (ID). Further, a unique ID and a unique key (a shared key) are written to each device, that is, the relay apparatus (node B) 2, the terminal apparatuses (nodes C and D) 3_1 and 3_2, and the other apparatus (node A) 1 in a state in which tamper resistance is secured. The external authentication apparatus 7 includes a list (a white list) in which authentication information such as IDs of authentic devices is listed up, so that the authentication apparatus 7 can verify received authentication information by using the white list and determine whether or not a corresponding device is an authentic apparatus (function of apparatus authentication).

The relay apparatus (node B) 2 transmits its own authentication information to the authentication apparatus 7. When there is an upper node (node A) 1 as shown in FIG. 1, the relay apparatus (node B) 2 transmits the authentication information from the upper node (node A) 1 to the authentication apparatus 7 through the network 5. Thereafter or in parallel with this, the relay apparatus (node B) 2 collects authentication information from the terminal apparatuses (nodes C and D) 3_1 and 3_2 coupled to the communication paths 4_2 and 4_3 and transmits the authentication information to the authentication apparatus 7 from the upper node (node A) 1 through the network 5. The upper node (node A) 1 shown in FIG. 1 is located higher than the relay apparatus (node B) 2, so that the upper node (node A) 1 is not included in other apparatuses whose authentication information should be collected by the relay apparatus (node B) 2. However, when another relay apparatus is located lower than the relay apparatus (node B) 2, the other relay apparatus is included in the other apparatuses whose authentication information should be collected by the relay apparatus (node B) 2.

The authentication apparatus 7 verifies the received authentication information by using the white list, determines whether or not a corresponding device is an authentic apparatus, and transmits a result of this to the relay apparatus (node B) 2. The relay apparatus (node B) 2 receives the result of apparatus authentication from the authentication apparatus 7, shuts down communication between the relay apparatus (node B) 2 and an apparatus determined to be unauthentic based on the result, and transmits communication control information to shut down communication with the apparatus determined to be unauthentic to the terminal apparatuses (nodes C and D) 3_1 and 3_2. The terminal apparatuses (nodes C and D) 3_1 and 3_2 shut down the communication between themselves and the apparatus determined to be unauthentic based on the communication control information. Here, the communication control information is control information for determining whether or not a communication partner device is authentic and shutting down communication with an unauthentic device. For example, the communication control information is a black list (illegal node information) in which IDs of illegal devices are listed up. On the other hand, the communication control information may be a white list (authenticated node information) in which IDs of authentic devices are listed up.

The node (A) 1 may be positioned as one relay apparatus. In FIG. 1 and the first embodiment, a configuration is shown in which the gateway node A (1) is located higher than the node (B) 2 that functions as a relay apparatus in order to clearly show that the relay apparatus need not necessarily be a gateway. However, the hierarchical structure as shown in FIG. 1 is not a prerequisite.

Thereby, even when an illegal apparatus that performs a Byzantine fault type attack is coupled to the communication paths 4_1 to 4_3 to which other apparatuses and the relay apparatus 2 are coupled, it is possible to exclude the illegal apparatus from the communication paths. Further, devices in the system cannot behave in a manner like a Byzantine fault, so that effects as described below can be obtained. It is not possible to communicate with devices other than devices that pass through a white list authentication, so that it is not possible to perform malicious redirection. If there is no response to a request for authentication information such as ID, it is assumed to be an authentication failure and coupling is disconnected. Therefore, relay of data by an illegal apparatus and supply of data to the illegal apparatus are stopped and falsification of data is prevented. Even when it is possible to falsify data, communication data including the falsified data cannot pass through the white list authentication, so that the falsified data is discarded. Further, due to the white list system, it is possible to individually invalidate a device where it is found that the device is damaged by illegal modification or theft. Further, compatibility with a hierarchized authentication system is high. By hierarchizing an authentication system, it is possible to obtain a risk reduction effect due to distributed management of secret information and scalability due to load distribution of an authentication server.

The devices that are coupled to each other by the communication paths 4_1 to 4_3 before the apparatus authentication described above are coupled after performing local authentication with each other. For example, the relay apparatus node (B) 2 performs local mutual authentication with the upper gateway node A (1) and the terminal apparatuses (nodes C and D) 3_1 and 3_2. Thereby, local communication in the communication paths to perform external authentication is established.

Figure 2:
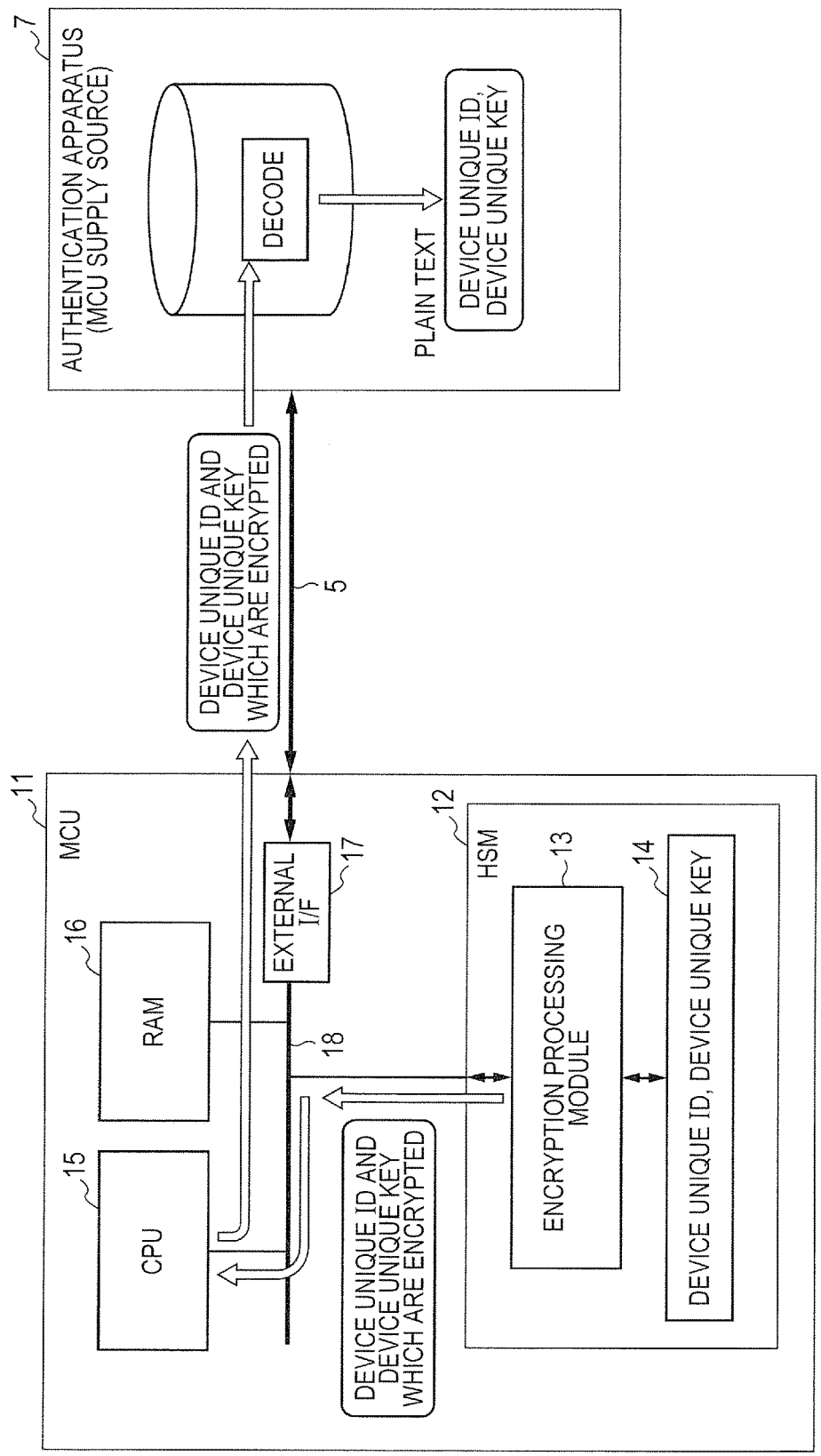
FIG. 2 is an explanatory diagram showing a configuration example of each device and an operation of apparatus authentication.

FIG. 2 is an explanatory diagram showing a configuration example of devices, that is, the relay apparatus (node B) 2, the terminal apparatuses (nodes C and D) 3_1 and 3_2, and the other apparatus (node A) 1 and an operation of apparatus authentication performed by the authentication apparatus 7. A secure microcomputer 11 is mounted on each device. The secure microcomputer 11 is an MPU (Micro Processor Unit) including a hardware security module (HSM) 12. The MPU 11 further includes a CPU (Central Processing Unit) 15, a RAM (Random Access Memory) 16, and an external interface (I/F) 17, which are intercoupled with each other along with the HSM 12 by a bus 18. The HSM 12 includes, for example, an encryption processing module 13 and a storage apparatus that holds secret information such as a device unique identifier (ID) and a device unique key 14. Tamper resistance of the HSM 12 is secured. The tamper resistance can be secured by various known techniques. For example, it can be configured so that content of the ID and the unique key cannot be read by optically observing the storage apparatus and then a time necessary for encryption processing and decryption processing and a waveform of consumption current do not depend on the values of the ID and the unique key, and further it can be configured so that the HSM 12 has resistance against fault injection attack. The MPU 11 may further include a ROM (Read Only Memory), an interrupt control circuit, a direct memory access controller, a peripheral function module, and the like. The bus 18 may be hierarchized. Although not restricted in particular, the MPU 11 is formed over a single semiconductor substrate of silicon or the like by using, for example, a known manufacturing technique of CMOS (Complementary Metal-Oxide-Semiconductor field effect transistor) LSI (Large Scale Integrated circuit).

The device unique ID and the device unique key are an identifier and a shared key (shared secret) which are shared with the authentication apparatus 7 based on an authentication protocol. The ID is an identifier of the device. The unique key is a key character string shared between the device and the authentication apparatus, is unique for each device, and is secret information used for authentication along with the ID. The device unique ID and the device unique key are written to the MPU 11 by, for example, a supply source of the MPU 11 when the MPU 11 is shipped. The authentication apparatus 7 is, for example, an authentication apparatus supplied by the supply source of the MPU 11. The authentication apparatus 7 holds a shared key corresponding to the device unique key and can authenticate the device unique key. The supply source of the MPU 11 holds a list of unique IDs, which are written to MPUs 11 that are officially shipped, as an authentic ID list (a white list), in the authentication apparatus 7 and further holds the shared keys corresponding to the unique keys.

Among the device unique ID and the device unique key, the device unique key is very important on security. Therefore, the device unique key can be read to outside of the HSM 12 only in a state in which the device unique key is encrypted. However, the method of encrypting the device unique key is optional. For example, a known encryption method such as a public key cryptosystem and a shared key cryptography can be employed.

The device unique ID and the device unique key are encrypted by an encryption processing module 13. The CPU 15 can read the encrypted device unique ID and device unique key through the bus 18 and transmit them to the external network 5 through the external I/F 17. The authentication apparatus 7 that receives the encrypted unique ID and unique key through the network 5 performs authentication by using a shared key held by the authentication apparatus 7 and decrypts the encrypted unique ID. The authentication apparatus 7 can determine whether or not a device that transmits a device unique ID is an authentic MPU by comparing the device unique ID that is decrypted into a plain text with the authentic ID list (the white list) held by the authentication apparatus 7.

Figure 3:
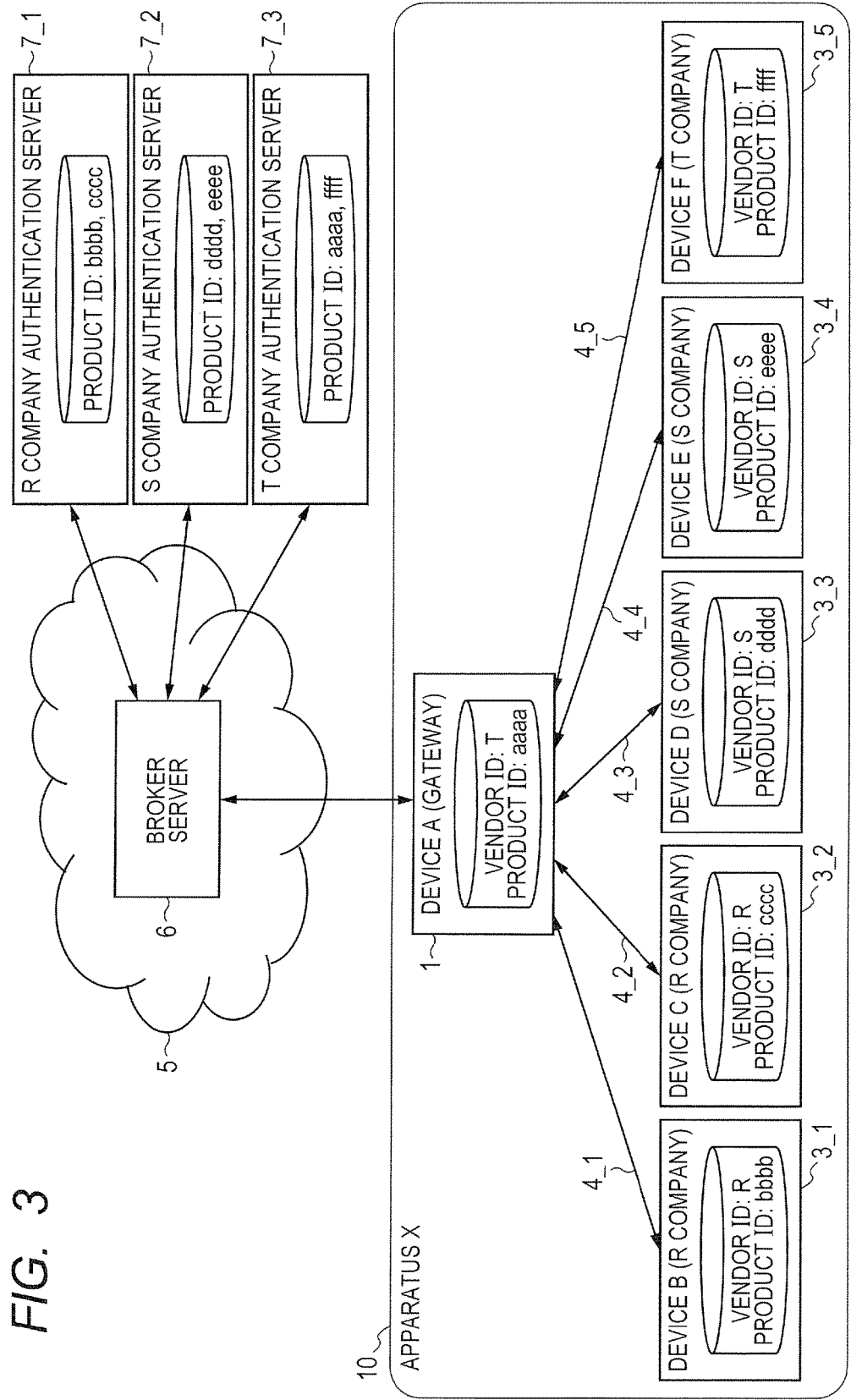
FIG. 3 is a schematic block diagram showing a configuration example of a system including a plurality of devices provided from a plurality of makers.

FIG. 3 is a schematic block diagram showing a configuration example of a system including a plurality of devices provided from a plurality of makers. As described in detail in a second embodiment described later, an apparatus (X) 10 is, for example, a vehicle, communication paths 4_1 to 4_5 are, for example, an in-vehicle network such as CAN (Controller Area Network), and devices A to F (1 and 3_1 to 3_5) are, for example, electronic control units (ECUs). The network and the apparatuses coupled to the network may be a network and apparatuses other than the in-vehicle network (CAN) and the electronic control units (ECUs), and can be changed to, for example, a medical network and medical instruments coupled to the medical network or an industrial network and industrial instruments coupled to the industrial network. Further, the network may have various forms of network paths regardless of wired or wireless. For example, when the network is an in-vehicle network, the network is not only CAN, but may be Flex Ray (registered trademark) or MOST (Media Oriented Systems Transport).

As described above, the number of makers that supply the MPU 11 such as a secure microcomputer mounted on each device is not limited to one. As illustrated in FIG. 3, the apparatus (X) 10 includes a gateway device A (1) made by T company, devices B and C (3_1 and 3_2) made by R company, devices D and E (3_3 and 3_4) made by S company, and a device F (3_5) made by T company. Regarding the authentication, various forms are considered such as a supply source of the mounted MPU 11 performs the authentication, a supply source of a device performs the authentication, and a maker of the apparatus (X) 10 performs the authentication. Therefore, as shown in FIG. 3, the companies have authentication servers (authentication apparatuses) 7_1 to 7_3, respectively. In such a case, a broker server 6 is arranged in the network 5. The broker server 6 collectively receives authentication requests from the apparatus (X) 10 and then distributes authentication information to the authentication servers 7_1 to 7_3, respectively. The authentication server 7_1 made by R company has a list of product IDs (bbbb and cccc) written to the devices made by R company and performs authentication of the devices made by R company. The authentication server 7_2 made by S company has a list of product IDs (dddd and eeee) written to the devices made by S company and performs authentication of the devices made by S company. The authentication server 7_3 made by T company has a list of product IDs (aaaa and ffff) written to the devices made by T company and performs authentication of the devices made by T company.

The communication between the devices 1 and 3_1 to 3_5 and the authentication servers 7_1 to 7_3 will be described in more detail.

Figure 4:
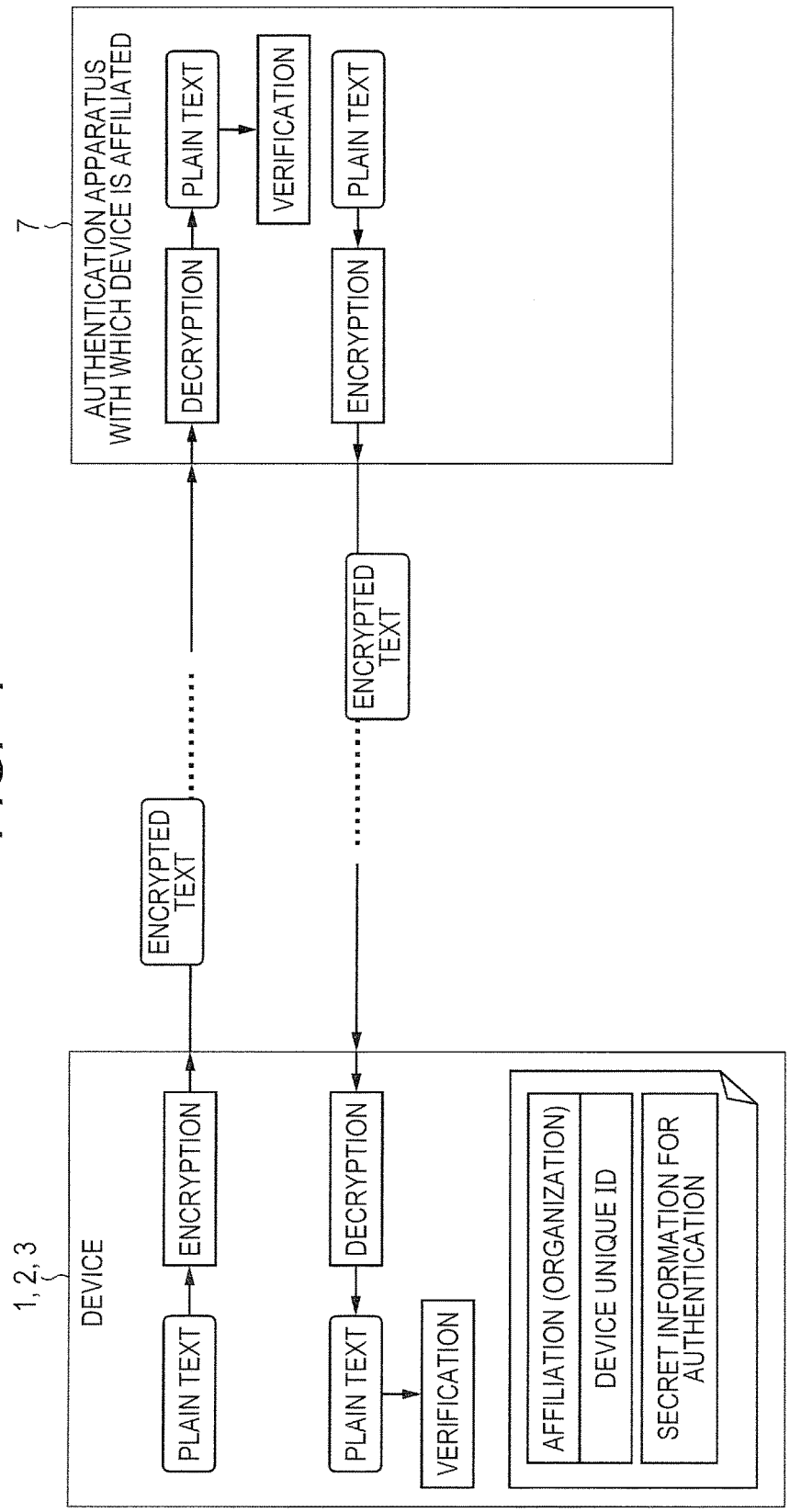
FIG. 4 is an explanatory diagram of communication between a device and an authentication apparatus.

FIG. 4 is an explanatory diagram of communication between the device 1 (for example, 1, 3_1, 3_2, 3_3, 3_4, 3_5, or 2) and the authentication apparatus 7 (for example, authentication apparatus 7_1, 7_2, or 7_3). The device 1 holds, for example, an affiliation (organization), a device unique ID, and secret information (unique key) for authentication as the authentication information. The affiliation (organization) is represented as a "vendor ID" in FIG. 3. The affiliation (organization) is information indicating an organization of the authentication apparatus 7 that should authenticate the device. It is possible to determine whether or not an organization is the affiliation organization depending on whether or not the authentication is successfully performed. In this case, the affiliation (organization) can be excluded from the authentication information. However, it is more preferable to use the affiliation (organization) because processing of the broker server can be simplified. The device unique ID is, for example, an ID written by a supply source of the device when the device is shipped. The secret information (unique key) for authentication is written or updated by equipment of the supply source of the device or can be updated by communication with the equipment of the supply source of the device. The device 1 transmits an encrypted text obtained by encrypting a plain text to the authentication apparatus 7. The authentication apparatus 7 that receives the encrypted text decrypts the encrypted text to return it to the plain text and verifies the plain text. The same goes for communication from the authentication apparatus 7 to the device 1. The authentication apparatus 7 transmits an encrypted text obtained by encrypting a plain text to the device 1. The device 1 that receives the encrypted text decrypts the encrypted text to return it to the plain text and verifies the plain text. A third party cannot generate the encrypted text and a third party cannot decrypt the encrypted text.

A flow of collection of authentication information and authentication performed by the authentication apparatus 7 will be described in more detail based on the system configuration illustrated in FIG. 1.

Figure 5:
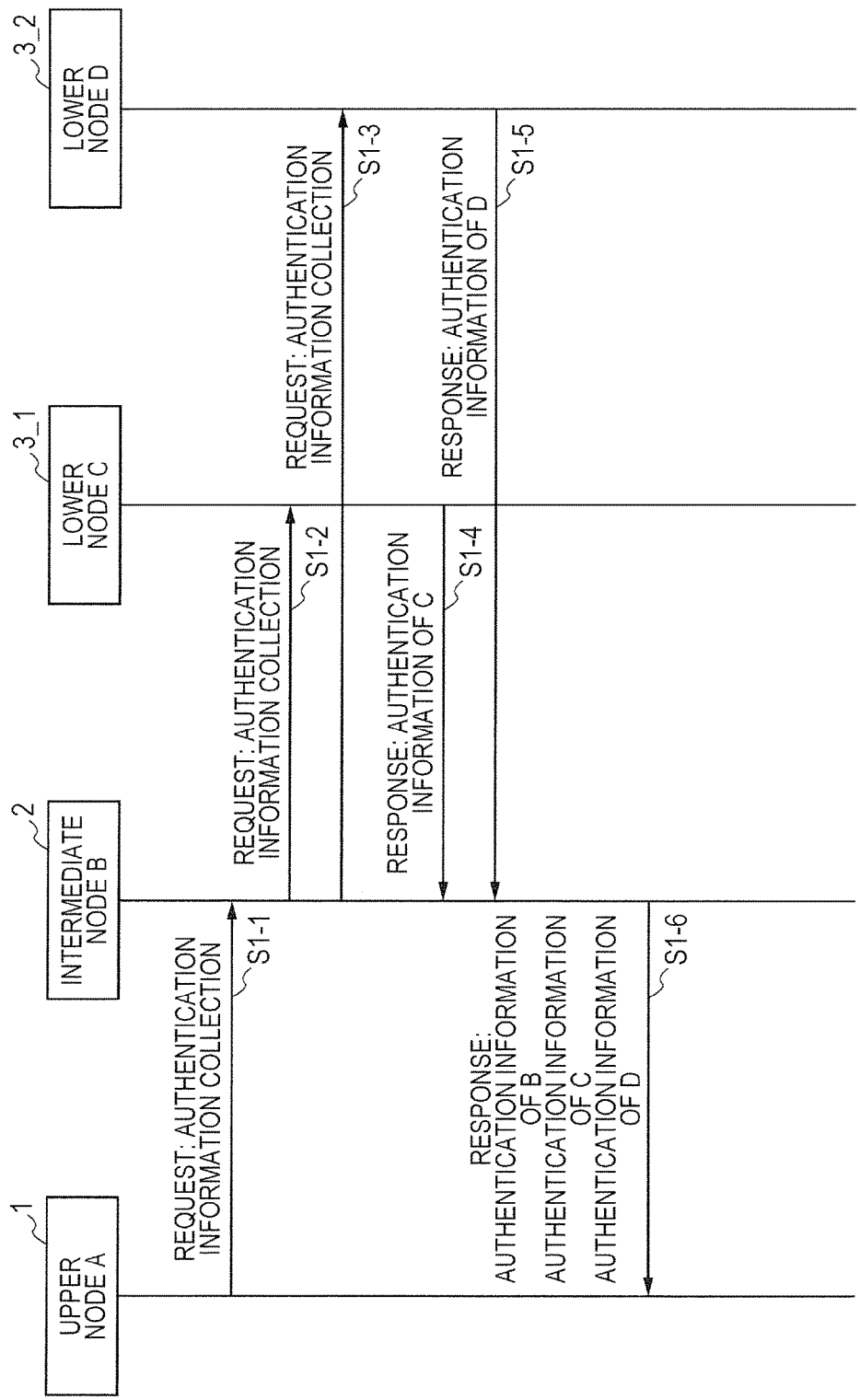
FIG. 5 is a sequence diagram showing an example of a collection flow of authentication information corresponding to the system configuration illustrated in FIG. 1.
Figure 6:
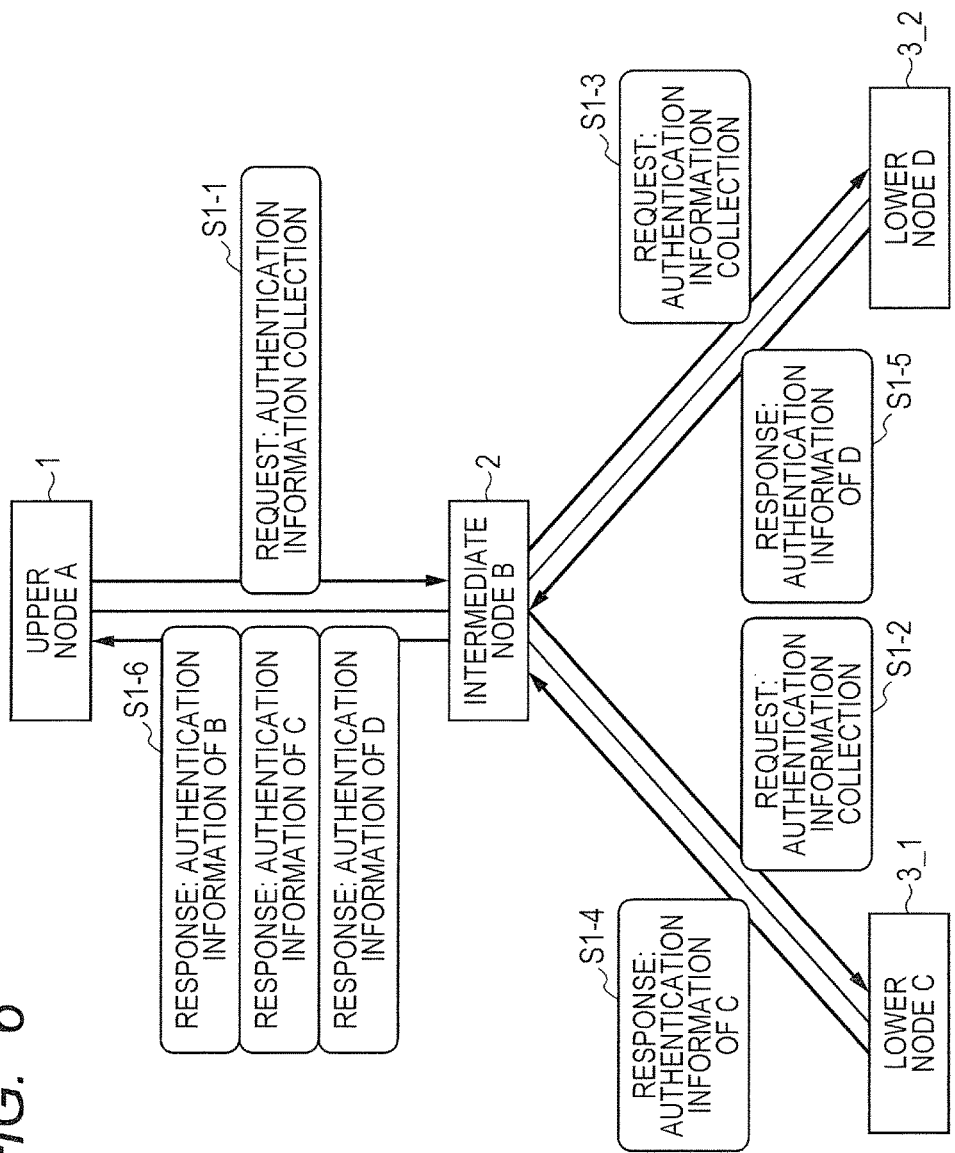
FIG. 6 is an explanatory diagram showing an example of a message transmitted and received in the collection flow of the authentication information illustrated in FIG. 5.

FIG. 5 is a sequence diagram showing an example of an authentication flow corresponding to the system configuration illustrated in FIG. 1. FIG. 6 is an explanatory diagram showing an example of a message transmitted and received in the authentication flow illustrated in FIG. 5. An upper node A (1) requests an intermediate node B (2) to collect authentication information (S1-1). The intermediate node B (2) that receives the request to collect authentication information requests lower nodes C and D (3_1 and 3_2) that are coupled at a position lower than the intermediate node B (2) to collect authentication information (S1-2 and S1-3). The lower node C (3_1) transmits authentication information unique to the lower node C as a response to the intermediate node B (2) (S1-4) and the lower node D (3_2) transmits authentication information unique to the lower node D as a response to the intermediate node B (2) (S1-5). The intermediate node B (2) combines the responses from the lower nodes C and D (3_1 and 3_2) and authentication information of the intermediate node B (2) and transmits the combined information as a response to the upper node A (1) (S1-6).

As described in detail in a third embodiment, a hierarchical network may be formed by further providing an intermediate node at a position lower than the intermediate node B (2). In this case, the depths of a request of authentication information collection and a response to the request may be limited. For example, when the depths are limited to 1, a breadth-first search is performed.

Figure 7:
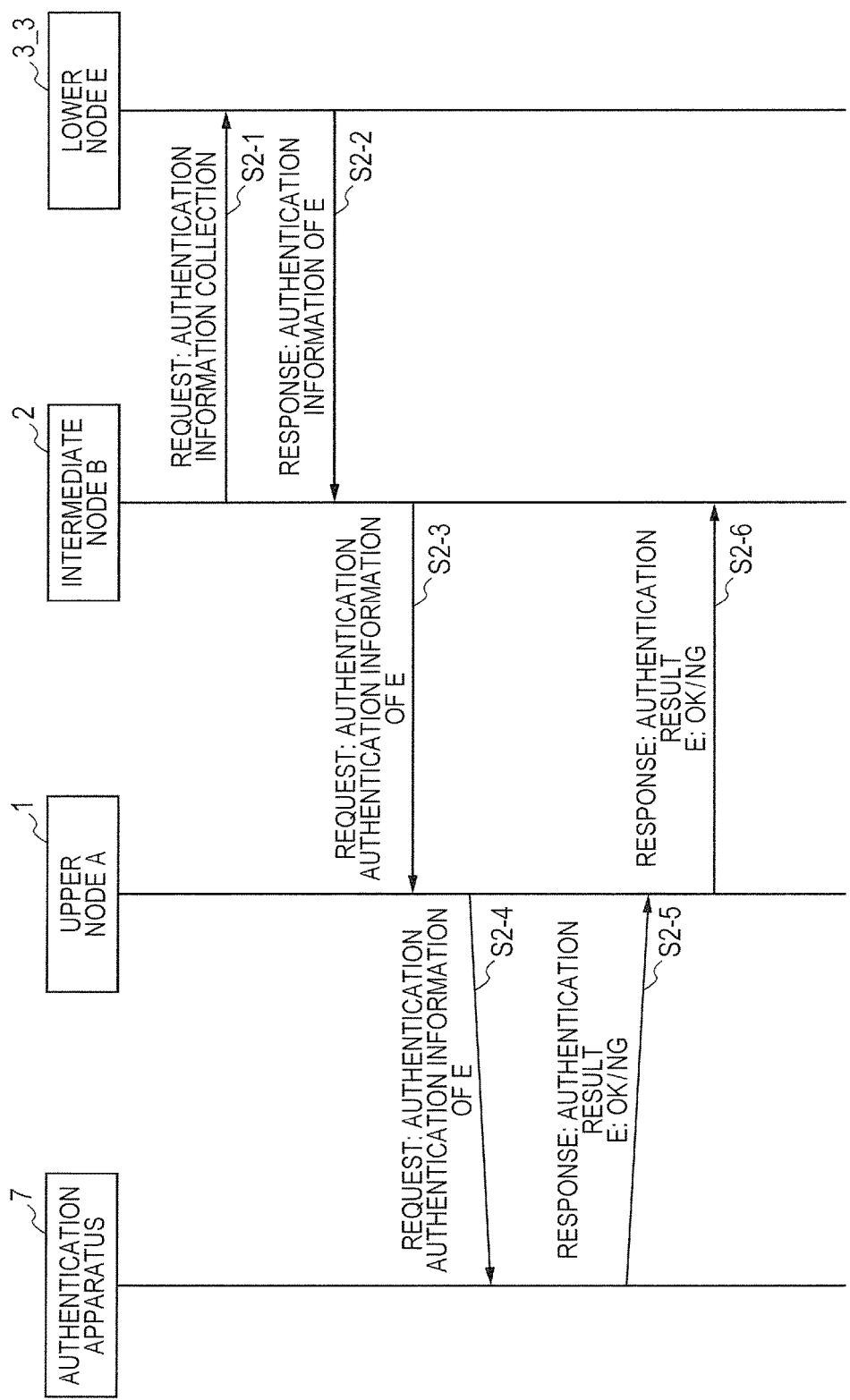
FIG. 7 is a sequence diagram showing an example of an authentication flow when a new lower node is coupled.
Figure 8:
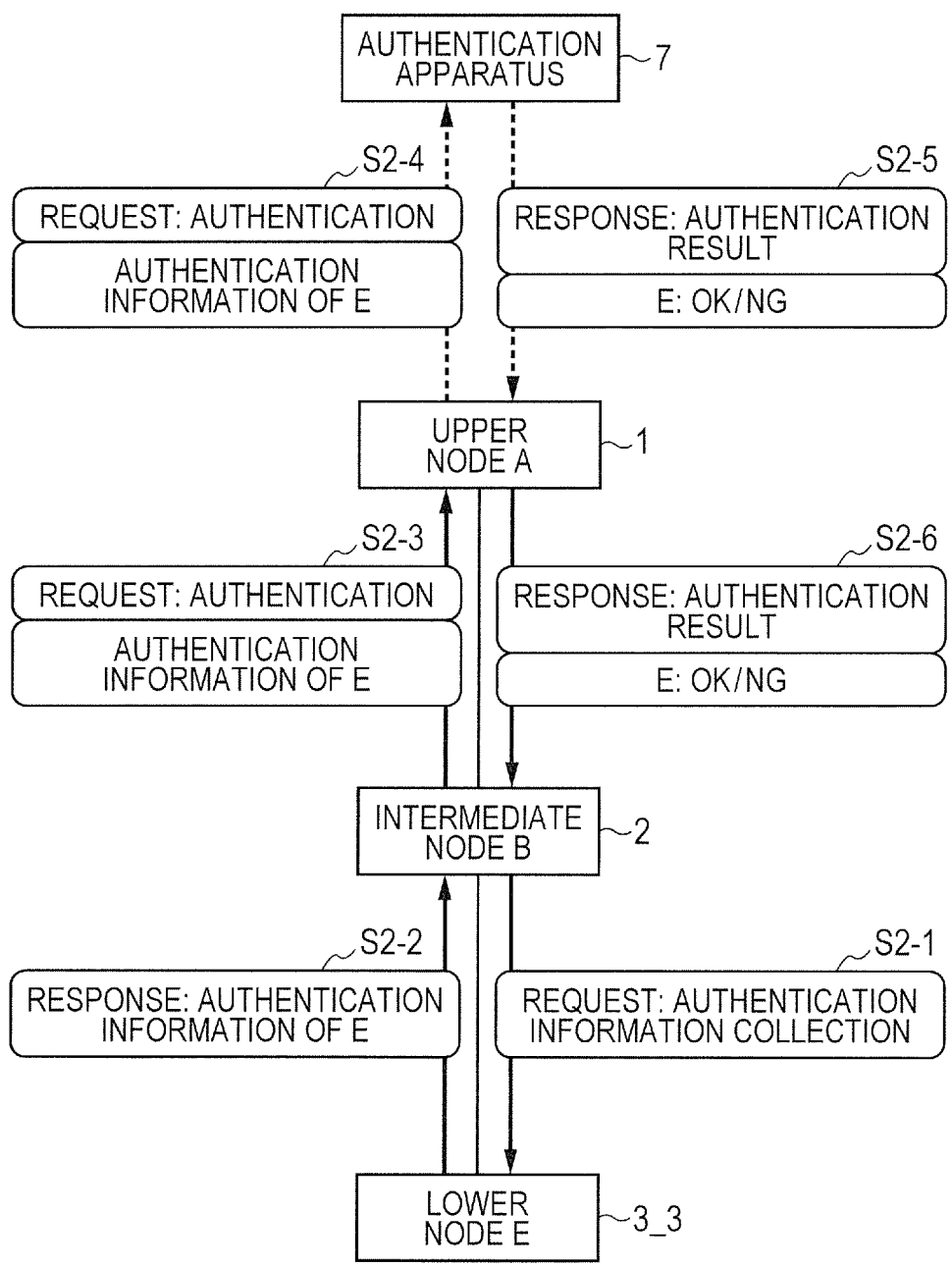
FIG. 8 is an explanatory diagram showing an example of a message transmitted and received in the authentication flow illustrated in FIG. 7.

FIG. 7 is a sequence diagram showing an example of an authentication flow when a new lower node E (3_3) is coupled. FIG. 8 is an explanatory diagram showing an example of a message transmitted and received in the authentication flow illustrated in FIG. 7. While FIGS. 5 and 6 illustrate flows in which two lower nodes C and D (3_1 and 3_2) are coupled and authenticated, FIGS. 7 and 8 illustrate authentication flows when the lower node E (3_3) is further coupled thereafter. In FIGS. 7 and 8, the lower nodes C and D (3_1 and 3_2) that have already been authenticated are omitted and only the lower node E (3_3) that is newly coupled is shown.

The intermediate node B (2) that detects that the new lower node E (3_3) is coupled transmits an authentication information collection request to the lower node E (3_3) (S2-1). The lower node E (3_3) transmits authentication information unique to the lower node E (3_3) as a response to the intermediate node B (2). After receiving the authentication information of the lower node E (3_3) as a response, the intermediate node B (2) transmits a request to authenticate the lower node E (3_3) based on the authentication information to the upper node A (1) (S2-3). Here, the intermediate node B (2) has already been authenticated, so that the intermediate node B (2) generates only the authentication information of the lower node E (3_3) without including the authentication information of the intermediate node B (2) and transmits the authentication information of the lower node E (3_3) to the upper node A (1). The authentication request of the lower node E (3_3) is redirected to upper nodes in order and reaches the authentication apparatus 7 (S2-4). The authentication apparatus 7 determines whether or not the node E (3_3) is an authentic apparatus by referring to the white list held by the authentication apparatus 7 and returns an authentication result as a response (S2-5). The response is redirected to lower nodes in order and the intermediate node B (2) can receive the authentication result (S2-6).

As described above referring to FIGS. 5 to 8, the intermediate node B (2) receives the result of apparatus authentication from the authentication apparatus 7 (S2-6). The intermediate node B (2) shuts down communication between itself and an apparatus determined to be unauthentic based on the result, and transmits communication control information to shut down communication with the apparatus determined to be unauthentic to the lower nodes C, D, E (3_1 to 3_3). The lower nodes C, D, E (3_1 to 3_3) shut down communication between themselves and the apparatus determined to be unauthentic based on the communication control information. Here, the communication control information may be control information for representing a determination result whether or not a communication partner device is authentic and shutting down communication with an unauthentic device. For example, the communication control information may be illegal node information in which IDs of illegal devices are listed up, or conversely may be authenticated node information in which IDs of authentic devices are listed up.

Figure 9:
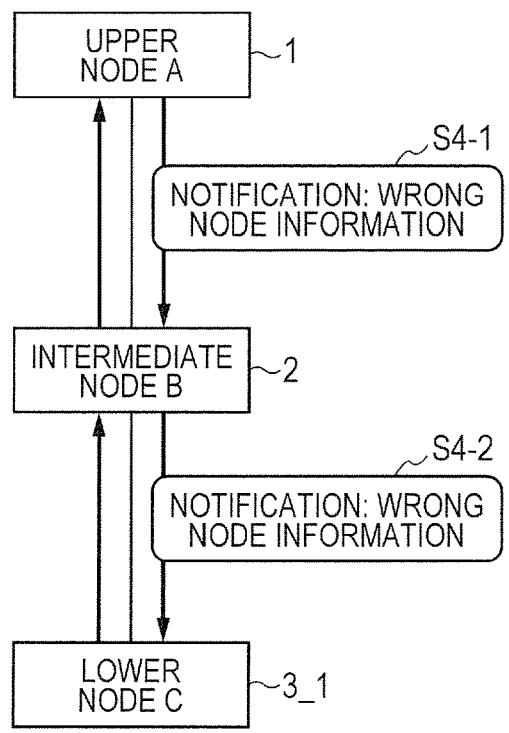
FIG. 9 is an explanatory diagram showing a flow of a case in which illegal node information is used as communication control information.
Figure 10:
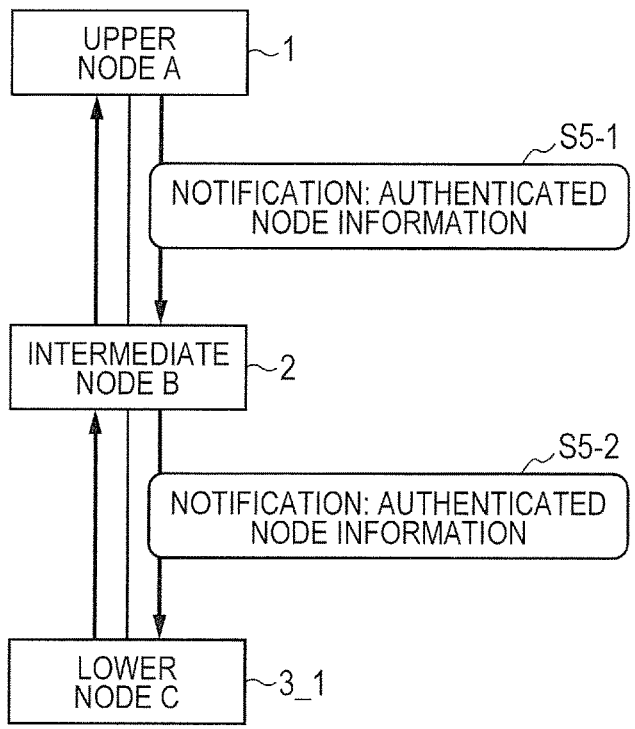
FIG. 10 is an explanatory diagram showing a flow of a case in which authenticated node information is used as communication control information.

FIG. 9 is an explanatory diagram showing a flow of a case in which the illegal node information is used as the communication control information. FIG. 10 is an explanatory diagram showing a flow of a case in which the authenticated node information is used as the communication control information. In FIGS. 9 and 10, only the lower node C (3_1) is shown as a lower node and the other lower nodes D and E (3_2 and 3_3) are omitted. However, the transmitted messages are the same.

As shown in FIG. 9, the intermediate node B (2) can receive the illegal node information from the authentication apparatus 7 as a result of apparatus authentication (S4-1) and transmit the illegal node information to the lower nodes C, D, and E (3_1 to 3_3) as the communication control information (S4-2).

As shown in FIG. 10, the intermediate node B (2) can receive the authenticated node information from the authentication apparatus 7 as a result of apparatus authentication (S5-1) and transmit the authenticated node information to the lower nodes C, D, and E (3_1 to 3_3) as the communication control information (S5-2).

Figure 11:
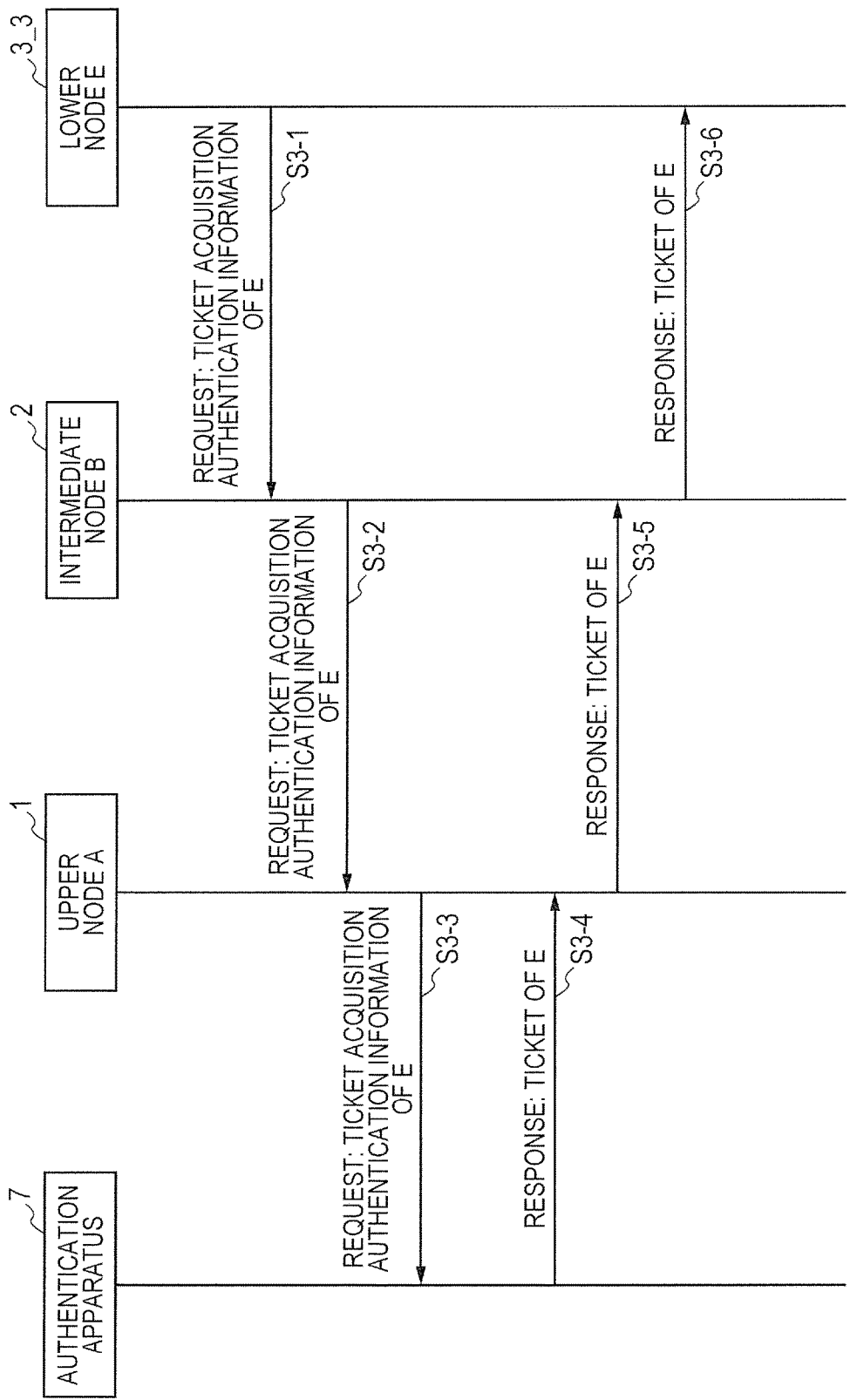
FIG. 11 is a sequence diagram showing another example of the authentication flow when a new lower node is coupled.
Figure 12:
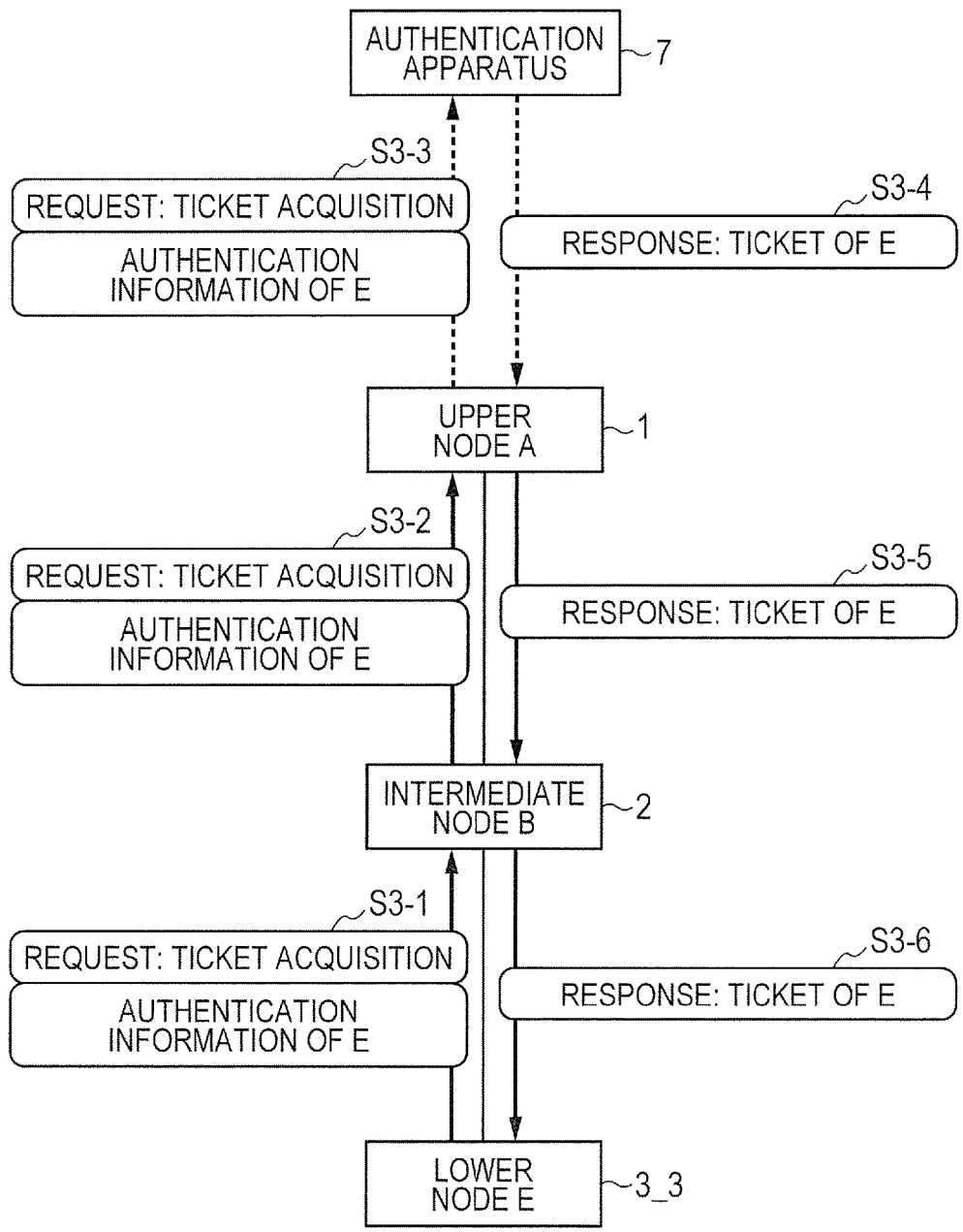
FIG. 12 is an explanatory diagram showing an example of a message transmitted and received in the authentication flow illustrated in FIG. 11.

FIG. 11 is a sequence diagram showing another example of the authentication flow when a new lower node E (3_3) is coupled. FIG. 12 is an explanatory diagram showing an example of a message transmitted and received in the authentication flow illustrated in FIG. 11. FIGS. 7 and 8 show authentication flows when the two lower nodes C and D (3_1 and 3_2) shown in FIGS. 5 and 6 are authenticated and thereafter the lower node E (3_3) is newly coupled. FIGS. 7 and 8 show flows in which the intermediate node B (2) detects that the new lower node E (3_3) is coupled and transmits an authentication information collection request. On the other hand, here, an authentication flow when the newly coupled lower node E (3_3) independently requests authentication will be described with reference to FIGS. 11 and 12.

The lower node E (3_3) that is newly coupled to the intermediate node B (2) transmits a ticket acquisition request based on the authentication information of the lower node E (3_3) to the intermediate node B (2) (S3-1). Here, the "ticket" is information that can be generated by only an authentication apparatus that can authenticate the node E (3_3), and the authentication apparatus 7 shares the unique ID and the key of the node E (3_3) with the node E (3_3), so that the authentication apparatus 7 can generate the ticket of the node E (3_3). The intermediate node B (2) that receives the ticket acquisition request from the node E (3_3) redirects the ticket acquisition request to the upper node A (1) (S3-2). The request is redirected up to the authentication apparatus 7 (S3-3), and the authentication apparatus 7 generates a ticket of the node E (3_3). At this time, the authentication apparatus 7 can generate the ticket of the node E (3_3) only when the node E (3_3) is an authentic device. For example, the authentication apparatus 7 can generate the ticket of the authentic node E (3_3) because the authentication apparatus 7 shares the unique ID and the key with the authentic node E (3_3). However, when the node E (3_3) is an unauthentic device, the authentication apparatus 7 cannot generate a corresponding ticket because the authentication apparatus 7 does not share the ID and the key with the unauthentic device. The ticket generated by the authentication apparatus 7 is redirected to lower nodes in order (S3-4 and S3-5), and the intermediate node B (2) receives the ticket and transfers the ticket to the node E (3_3) (S3-6).

Thereby, when a terminal apparatus is newly coupled to a communication path, it is possible to independently obtain information of an illegal apparatus to be excluded from the communication path from the new terminal apparatus.

An embodiment in which a newly added apparatus is a subject of the authentication request as described above will be described in further detail in a fourth embodiment.

Second Embodiment <Two-Step Authentication>

Figure 13:
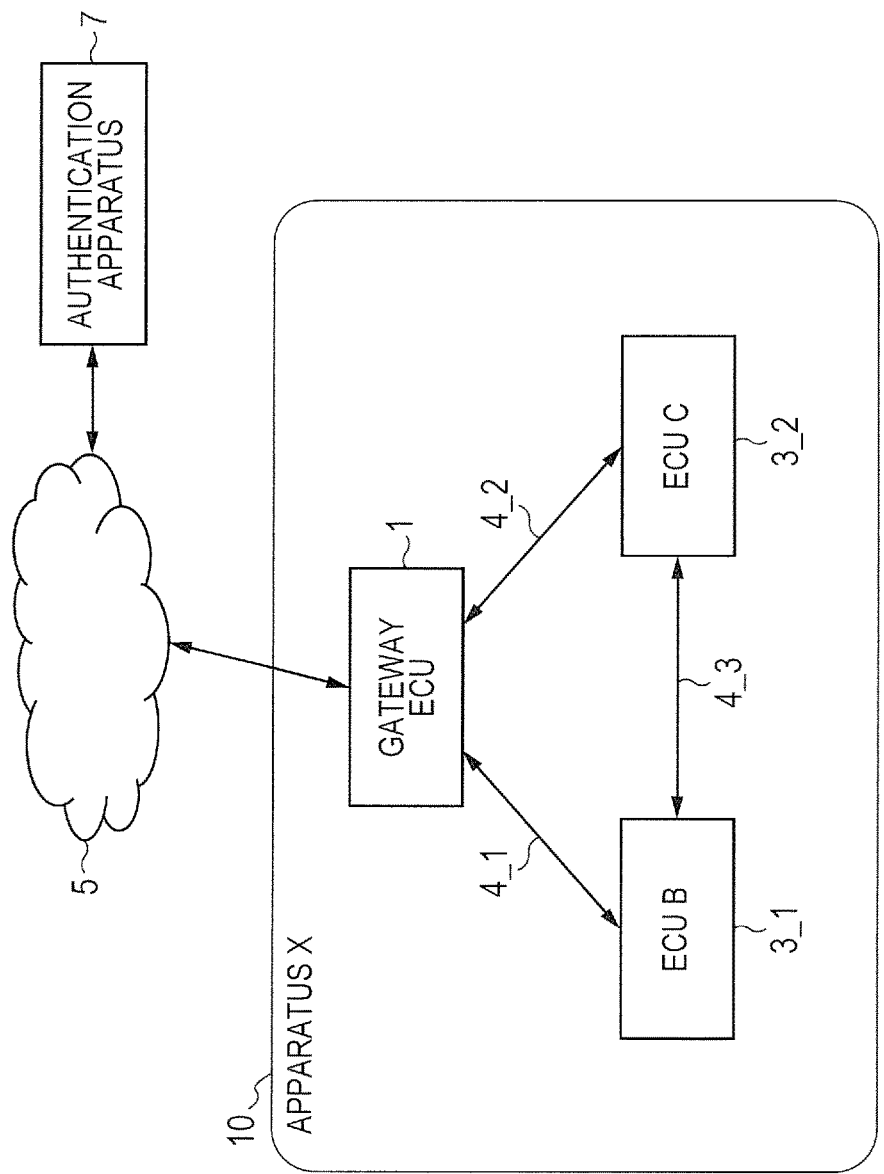
FIG. 13 is a block diagram showing a system configuration example of a second embodiment.

FIG. 13 is a block diagram showing a system configuration example of a second embodiment.

In an apparatus (X) 10 such as a vehicle, a plurality of electronic control units (ECUs), that is, a gateway ECU 1, an ECU (B) 3_1, and an ECU (C) 3_2 are mounted, and these ECUs are hierarchically coupled by networks 4_1 to 4_3 such as CAN inside the apparatus. The gateway ECU 1 can communicate with an external authentication apparatus 7 by an external network 5. The external network 5 is an arbitrary communication network regardless of wired or wireless. The gateway ECU 1 can inquire of the authentication apparatus 7 located on the external network 5 whether or not the unique IDs of devices (the gateway ECU 1, the ECU (B) 3_1, and the ECU (C) 3_2) are included in the white list.

After the apparatus (X) 10 starts up, the gateway ECU 1, the ECU (B) 3_1, and the ECU (C) 3_2 authenticate with each other and establish a coupling. This is a local mutual coupling authentication. Around that time, the gateway ECU 1 transmits an ID and a unique key, which are authentication information of the gateway ECU 1 and which are in an encrypted state, to the authentication apparatus 7 and receives an authentication result.

Thereafter, the gateway ECU 1 requests the ECU (B) 3_1 and the ECU (C) 3_2 to transmit the unique ID and acquires authentication information in order to start communication with each ECU. Here, the authentication information is, for example, an ID and a unique key, which are unique to each ECU. The authentication information is acquired in a state in which the authentication information is encrypted by each ECU. The gateway ECU 1 transmits the authentication information acquired from the ECU (B) 3_1 and the ECU (C) 3_2 to the authentication apparatus 7 through the network 5 and requests authentication. The authentication apparatus 7 that receives the authentication request performs an authentication protocol using the received unique key and a shared key held by the authentication apparatus 7 corresponding to each ECU to authenticate each ECU, checks whether or not IDs of the ECU (B) 3_1 and the ECU (C) 3_2 are included in the white list, and returns an authentication result of the above to the gateway ECU 1.

Here, it is assumed that an external authentication of the ECU (B) 3_1 has succeeded and an external authentication of the ECU (C) 3_2 has failed. In other words, it is assumed that the unique ID of the ECU (B) 3_1 is present in the white list held by the authentication apparatus 7, but the unique ID of the ECU (C) 3_2 is not present in the white list. Based on the authentication result, the gateway ECU 1 starts communication with the ECU (B) 3_1 where the external authentication has succeeded, disconnects communication with the ECU (C) 3_2 where the external authentication has failed, and notifies the ECU (B) 3_1 that the authentication of the ECU (C) 3_2 has failed. The ECU (B) 3_1 receives information of the above and disconnects communication with the ECU (C) 3_2.

Here, in a state in which the local mutual coupling authentication is done, transmission and reception of a necessary minimum message for external authentication are allowed through the communication paths 4_1 to 4_3, and after the external authentication has succeeded, only a communication path where the external authentication has succeeded may be changed into a state in which transmission and reception of specific control information are allowed. On the other hand, regarding the disconnection of communication path of the ECU where the external authentication has failed, a signal may be shut down in a physical layer or a signal may be discarded in an upper logical layer. In the example described above, the communication paths 4_2 and 4_3 are disconnected.

As described above, in the apparatus (X) 10, a two-step authentication is performed by using the external authentication apparatus 7, so that it is possible to exclude an illegal ECU (the ECU (C) 3_2 in the above example) that cannot be excluded by only information inside the apparatus (X) 10 and to secure the robustness of the system. However, when the apparatus (X) 10 is a vehicle and each ECU is an in-vehicle electronic control unit, it is considered that the vehicle becomes unable to travel if communication is disconnected without exception. Therefore, it may be configured to ask a user (a driver of the vehicle) whether or not to disconnect communication with an ECU that is determined to be illegal, and to maintain the communication with the ECU that is determined to be illegal depending on an instruction of the user.

Shared Bus Type Coupling

Figure 14:
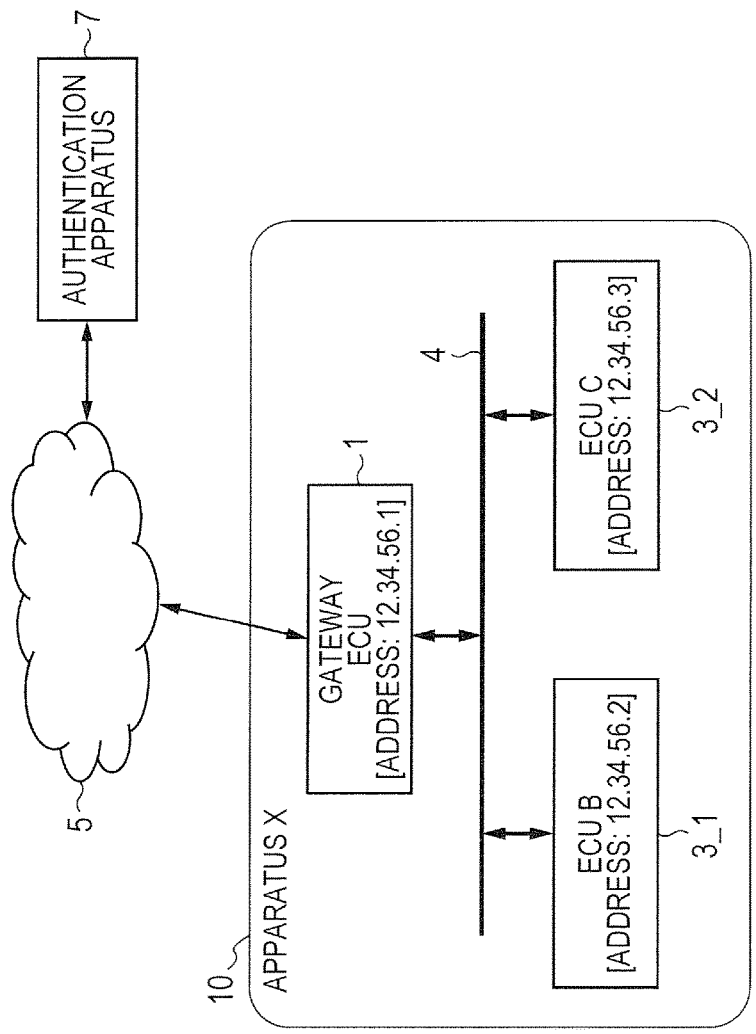
FIG. 14 is a block diagram showing another system configuration example of the second embodiment.

FIG. 14 is a block diagram showing another system configuration example of the second embodiment. The network in the apparatus (X) 10 is configured by a shared bus type coupling instead of the star type coupling as described above (FIG. 13).

Generally, in the shared bus type coupling network, devices coupled on the same bus are given individual addresses, respectively, and information is transmitted and received based on the individual addresses. In this description, it is assumed that addresses 12.34.56.1, 12.34.56.2, and 12.34.56.3 are assigned to the gateway ECU 1, the ECU (B) 3_1, and the ECU (C) 3_2, respectively. In the communication of shared bus type coupling network, these addresses are used, and a message (a packet) in which a destination address and a transmission source address are given to transmission data which is a payload is transmitted to a bus.

Figure 15:
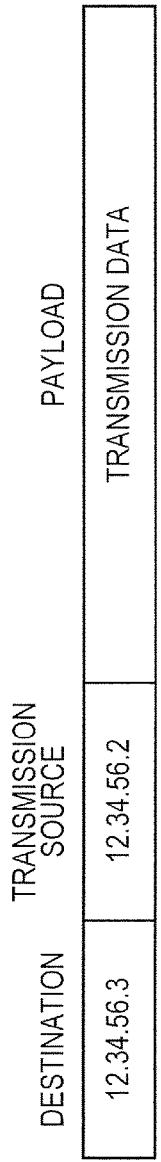
FIG. 15 is an explanatory diagram showing a configuration example of a communication packet in a shared bus type coupling network.

FIG. 15 is an explanatory diagram showing a configuration example of a communication packet in the shared bus type coupling network. A packet transmitted from the ECU (B) 3_1 to a destination, that is, the ECU (C) 3_2 is illustrated. The address 12.34.56.3 of the ECU (C) 3_2 defined as the destination and the address 12.34.56.2 of the ECU (B) 3_1 defined as the transmission source are given to transmission data which is a payload.

When this packet is transmitted to the bus 4, the gateway ECU 1 does not receive the packet because the destination 12.34.56.3 given to the packet does not corresponds to the address 12.34.56.1 of the gateway ECU 1. The ECU (C) 3_2 receives this packet because the destination corresponds to the address 12.34.56.3 of the ECU (C) 3_2. Therefore, communication where the destination is 12.34.56.3 and the transmission source is 12.34.56.2 can be identified with communication transmitted from the ECU (B) 3_1 to the ECU (C) 3_2 in the communication path 4_3 shown in FIG. 13.

On the other hand, a packet where the address 12.34.56.2 of the ECU (B) 3_1 is defined as the destination and the address 12.34.56.3 of the ECU (C) 3_2 is defined as the transmission source is communication from the ECU (C) 3_2 to the ECU (B) 3_1. Therefore, communication where the destination is 12.34.56.2 and the transmission source is 12.34.56.3 can be identified with communication transmitted from the ECU (C) 3_2 to the ECU (B) 3_1 in the communication path 4_3 shown in FIG. 13.

In this way, the communication between the ECU (B) 3_1 and the ECU (C) 3_2 on the bus can be assumed to be communication on the communication path 4_3 of one-to-one star type coupling.

In the same manner, communication where the destination is 12.34.56.1 and the transmission source is 12.34.56.2 and communication where the destination is 12.34.56.2 and the transmission source is 12.34.56.1 can be assumed to be communication on the communication path 4_1 of one-to-one star type coupling between the gateway ECU 1 and the ECU (B) 3_1. Further, communication where the destination is 12.34.56.1 and the transmission source is 12.34.56.3 and communication where the destination is 12.34.56.3 and the transmission source is 12.34.56.1 can be assumed to be communication on the communication path 4_2 of one-to-one star type coupling between the gateway ECU 1 and the ECU (C) 3_2.

Therefore, a bus type network (FIG. 14) including the gateway ECU 1, the ECU (B) 3_1, and the ECU (C) 3_2 can be discussed based on a network (FIG. 13) in which individual ECUs are coupled in a star shape.

Even when the number of ECUs coupled to the bus increases, it is possible to conduct a similar discussion.

Figure 16:
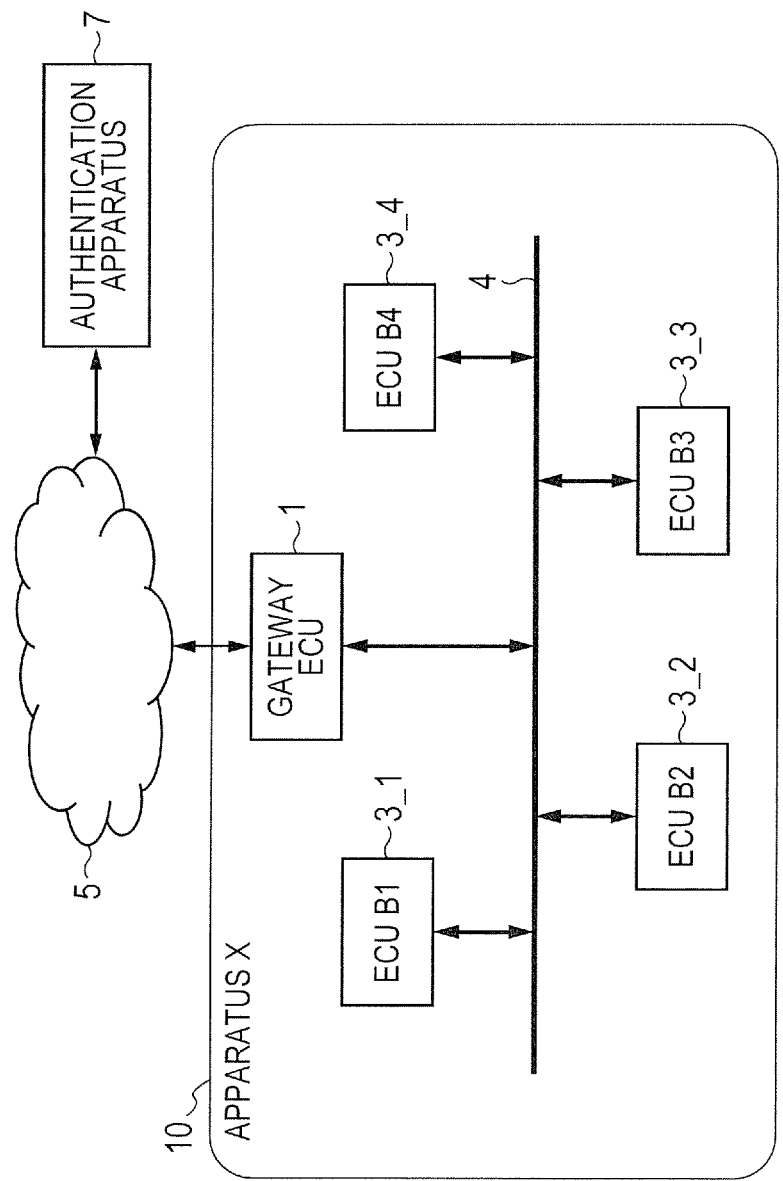
FIG. 16 is a block diagram showing a system configuration example when the number of ECUs coupled to a bus type network mounted on an apparatus X is increased to five.

FIG. 16 is a block diagram showing a system configuration example when the number of ECUs coupled to a bus type network mounted on the apparatus (X) 10 is increased to five. The gateway ECU 1 and ECU (B1) 3_1 to ECU (B4) 3_4 are coupled to the bus 4.

Figure 17:
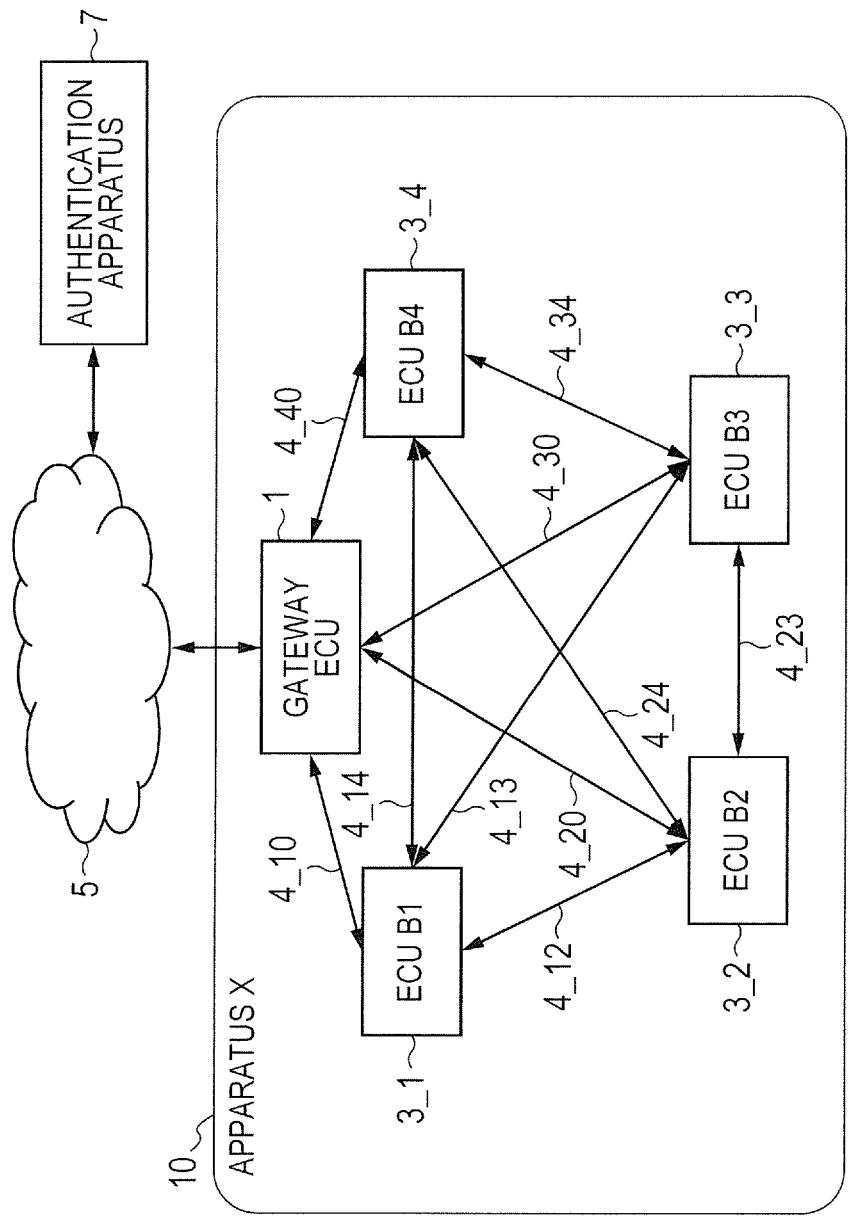
FIG. 17 is a block diagram showing a system configuration example of a case in which a star type coupling network, in which the number of ECUs is five, corresponding to FIG. 16 is mounted on the apparatus X.

FIG. 17 is a block diagram showing a system configuration example of a case in which a star type coupling network, in which the number of ECUs is five, corresponding to FIG. 16 is mounted on the apparatus (X) 10. This can be assumed to be a star type coupling network including wiring lines, the number of which corresponds to the number of combinations of transmission source and destination. In this case, the structure of the network is a complete graph whose number of apexes is five.

At this time, it is possible to realize broadcast communication in each network, and two networks can be discussed by assuming that the two networks are the same. In the bus type network shown in FIG. 16, the addresses of the gateway ECU 1 and the ECU (B1) 3_1 to the ECU (B4) 3_4 are defined as 12.34.56.1 to 12.34.56.5, respectively. At this time, broadcast communication from one ECU, for example, the ECU (B1) 3_1 to the gateway ECU 1 and the other ECUs which are the ECU (B2) 3_2 to the ECU (B4) 3_4 is realized by using an address value, whose least significant digit is masked such as 12.34.56.*, as destinations. On the other hand, in the star type network shown in FIG. 17, the broadcast communication is realized by simultaneously transmitting the same data to communication paths 4_10, 4_12, 4_13, and 4_14.

Therefore, even when the number of ECUs coupled to the bus increases, an equivalent star type network can be formed, so that it is possible to conduct a discussion similar to that of the bus type network.

While the apparatus X that includes one gate way ECU and the other two ECUs as shown in FIGS. 13 and 14 is described in the second embodiment, the number of ECUs and the structure of network can be arbitrarily changed.

Third Embodiment <Hierarchical Network>

In the second embodiment described above, it is described that the number of ECUs and the structure of network can be arbitrarily changed in the communication paths 4 in the apparatus X. However, the network including the communication paths 4 may be hierarchized. Even when the network of ECUs has a multi-layer tree structure, it is possible to authenticate the entire system by performing authentication for each layer and increasing the number of reliable nodes.

Figure 18:
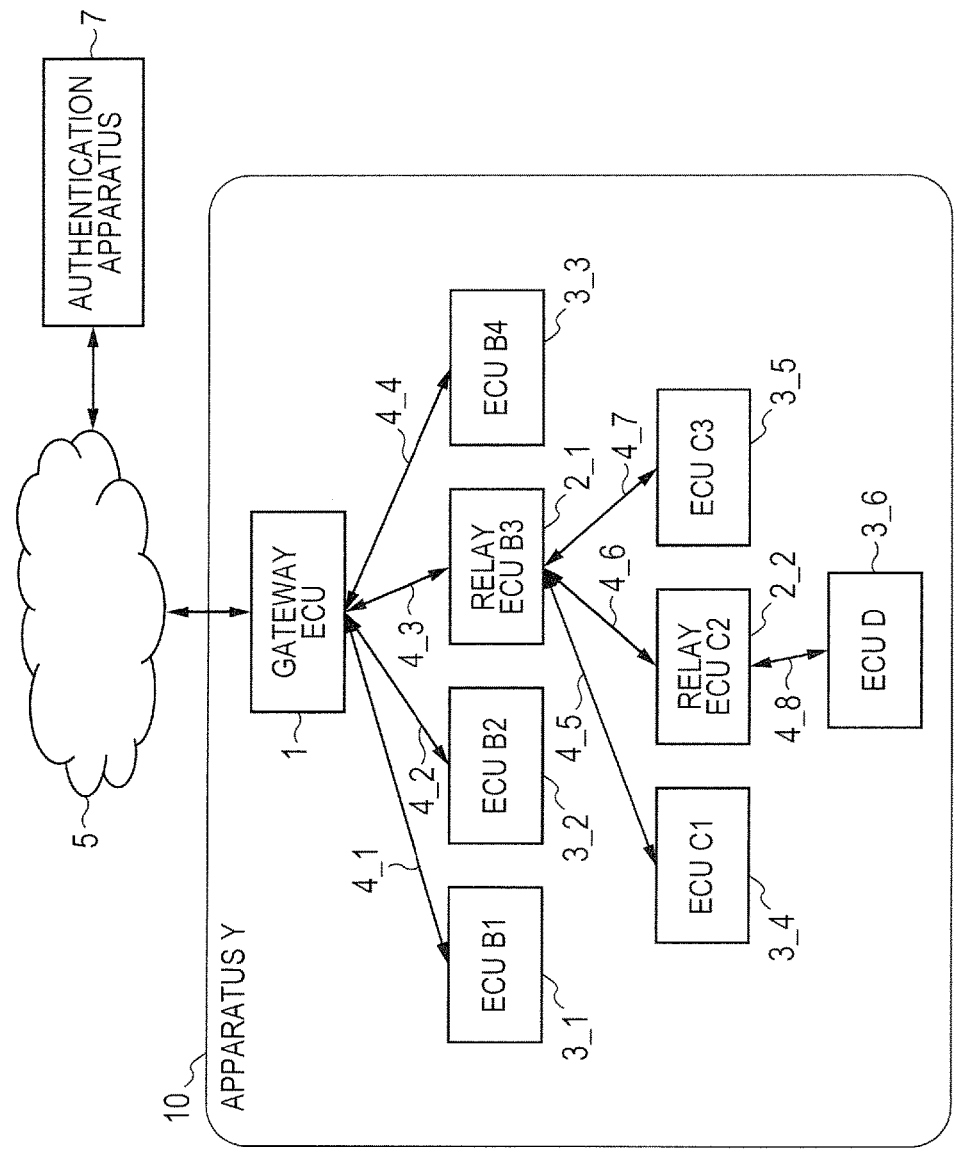
FIG. 18 is a block diagram showing a configuration example of a third embodiment.

FIG. 18 is a block diagram showing a system configuration example of a third embodiment.

In an apparatus (Y) 10 such as a vehicle, a plurality of ECUs including a gateway ECU 1 that can communicate with the external authentication apparatus 7 through the external network 5 are mounted, and these ECUs are hierarchically coupled by networks 4_1 to 4_8 such as CAN inside the apparatus. The ECU (B1) 3_1, the ECU (B2) 3_2, the ECU (B3) 2_1, and the ECU (B4) 3_3 that are directly coupled to the gateway ECU 1 through the communication paths 4_1 to 4_4, respectively, are a first layer. Among them, the ECU (B3) 2_1 is a relay apparatus (an intermediate node) to a second layer. The ECU (C1) 3_4, the ECU (C2) 2_2, and the ECU (C3) 3_5 that are directly coupled to the relay ECU (B3) 2_1 through the communication paths 4_5 to 4_7, respectively, are a second layer. Among them, the ECU (C2) 2_2 is a relay apparatus (an intermediate node) to a third layer. The ECU (D) 3_6 that is directly coupled to the relay ECU (C2) 2_2 through the communication path 4_8 is a third layer. The ECUs (C1 to C3) 3_4, 2_2, and 3_5 and the ECU (D) 3_6 which are not directly coupled to the gateway ECU 1 communicate with the gateway ECU 1 or an ECU in another layer through the relay ECU (B3) 2_1 or the relay ECU (C2) 2_2 to which each ECU is coupled.

After the apparatus (Y) 10 starts up, the plurality of ECUs including the gateway ECU 1 perform local mutual coupling authentication with each other and establish a coupling. Around that time, the gateway ECU 1 transmits an ID and a unique key, which are authentication information of the gateway ECU 1 and which are in an encrypted state, to the authentication apparatus 7 and receives an authentication result.

Thereafter, processing for receiving external authentication for each ECU in the first layer is performed through the gateway ECU 1. The gateway ECU 1 collects authentication information from the ECU (B1) 3_1, the ECU (B2) 3_2, the ECU (B3) 2_1, and the ECU (B4) 3_3 in the first layer and transmits the authentication information to the authentication apparatus 7 to request authentication. The authentication apparatus 7 performs authentication using the white list and returns an authentication result to the gateway ECU 1. The gateway ECU 1 starts communication with ECUs, where the external authentication has succeeded, from among the ECU (B1) 3_1, the ECU (B2) 3_2, the ECU (B3) 2_1, and the ECU (B4) 3_3 in the first layer. Communication after the local mutual authentication is limited to transmission and reception of message for the external authentication. However, the limitation is released in communication in this stage.

Subsequently, processing for receiving external authentication for each ECU in the second layer is performed through the externally authenticated relay ECU (B3) 2_1. However, when the external authentication of the relay ECU (B3) 2_1 fails, authentication processing thereafter is not performed. The relay ECU (B3) 2_1 collects authentication information from the ECU (C1) 3_4, the ECU (C2) 2_2, and the ECU (C3) 3_5 in the second layer and transmits the authentication information to the gateway ECU 1 to request authentication. The gateway ECU 1 that receives the authentication request transmits the authentication request to the authentication apparatus 7 to request authentication. The authentication apparatus 7 performs authentication using the white list and returns an authentication result to the gateway ECU 1. The gateway ECU 1 that receives the result transfers the result to the relay ECU (B3) 2_1 (redirection). The relay ECU (B3) 2_1 starts communication with ECUs, where the external authentication has succeeded, from among the ECU (C1) 3_4, the ECU (C2) 2_2, and the ECU (C3) 3_5 in the second layer.

Subsequently, processing for receiving external authentication for each ECU in the third layer is performed through the externally authenticated relay ECU (C2) 2_2. However, when the external authentication of the relay ECU (C2) 2_2 fails, authentication processing thereafter is not performed. The relay ECU (C2) 2_2 collects authentication information from the ECU (D) 3_6 in the third layer and transmits the authentication information to the relay ECU (B3) 2_1 to request authentication. The ECU (B3) 2_1 that receives the authentication request redirects the request to the gateway ECU 1. The gateway ECU 1 that receives the request from the relay ECU (B3) 2_1 transmits the request to the authentication apparatus 7 to request authentication. The authentication apparatus 7 performs authentication using the white list and returns an authentication result to the gateway ECU 1. The gateway ECU 1 that receives the result redirects the result to the relay ECU (B3) 2_1. The relay ECU (B3) 2_1 that receives the redirected authentication result further redirects the authentication result to the relay ECU (C2) 2_2. When the ECU (D) 3_6 successfully performs external authentication, the relay ECU (C2) 2_2 starts communication with the ECU (D) 3_6.

As described above, even when the network of ECUs has a multi-layer tree structure, it is possible to authenticate the entire system by performing authentication for each layer and increasing the number of reliable nodes.

When an ECU fails in external authentication, the gateway ECU 1, the relay ECU (B3) 2_1, or the relay ECU (C2) 2_2 disconnects communication with the ECU that fails in the authentication. When authentication of the ECU (B1) 3_1 fails as a result of external authentication of each ECU in the first layer, the gateway ECU 1 disconnects communication with the ECU (B1) 3_1. When authentication of the ECU (C1) 3_4 fails as a result of external authentication of each ECU in the second layer, the gateway ECU 1 redirects the result of the external authentication to the relay ECU (B3) 2_1 and the relay ECU (B3) 2_1 disconnects communication with the ECU (C1) 3_4. When authentication of the relay ECU (C2) 2_2 fails as a result of external authentication of each ECU in the second layer, the gateway ECU 1 redirects the result of the external authentication to the relay ECU (B3) 2_1 and the relay ECU (B3) 2_1 disconnects communication with the relay ECU (C2) 2_2. As a result, the external authentication of the ECU (D) 3_6 in the third layer is not performed.

In the above description, an embodiment is described in which processing for receiving external authentication is performed sequentially for each layer. However, all or part of the processing can be collectively performed.

After the apparatus (Y) 10 starts up, the plurality of ECUs including the gateway ECU 1 perform local mutual coupling authentication with each other and establish a coupling. Around that time, the gateway ECU 1 transmits an ID and a unique key, which are authentication information of the gateway ECU 1 and which are in an encrypted state, to the authentication apparatus 7 and receives an authentication result.

First, the gateway ECU 1 requests the ECU (B1) 3_1, the ECU (B2) 3_2, the ECU (B3) 2_1, and the ECU (B4) 3_3 in the first layer to collect authentication information. The relay ECU (B3) 2_1 requests the ECU (C1) 3_4, the ECU (C2) 2_2, and the ECU (C3) 3_5 in the second layer to collect authentication information. The relay ECU (C2) 2_2 requests the ECU (D) 3_6 in the third layer to collect authentication information.

The ECU (B1) 3_1, the ECU (B2) 3_2, and the ECU (B4) 3_3 in the first layer return their own authentication information to the gateway ECU 1 as a response. The ECU (C1) 3_4 and the ECU (C3) 3_5 in the second layer return their own authentication information to the relay ECU (B3) 2_1 as a response. The ECU (D) 3_6 in the third layer returns its own authentication information to the relay ECU (C2) 2_2 as a response.

The gateway ECU 1 stores the authentication information received from the ECU (B1) 3_1, the ECU (B2) 3_2, and the ECU (B4) 3_3 and waits for a response from the relay ECU (B3) 2_1. The relay ECU (B3) 2_1 stores the authentication information received from the ECU (C1) 3_4 and the ECU (C3) 3_5 and waits for a response from the relay ECU (C2) 2_2.

The relay ECU (C2) 2_2 returns the authentication information received from the ECU (D) 3_6 and its own authentication information to the relay ECU (B3) 2_1 as a response. The relay ECU (B3) 2_1 returns the authentication information of the ECU (D) 3_6 and the relay ECU (C2) 2_2 that is received from the relay ECU (C2) 2_2, the stored authentication information that is received from the ECU (C1) 3_4 and the ECU (C3) 3_5, and its own authentication information to the gateway ECU 1 as a response. The gateway ECU 1 combines the authentication information of the ECU (D) 3_6, the ECU (C2) 2_2, the ECU (C1) 3_4, the ECU (C3) 3_5, and the ECU (B3) 2_1 which is received from the relay ECU (B3) 2_1, the authentication information of the ECU (B1) 3_1, the ECU (B2) 3_2, and the ECU (B4) 3_3 which is stored, and its own authentication information, and transmits an authentication request of the combined authentication information to the authentication apparatus 7.

The authentication apparatus 7 performs authentication for each piece of the received authentication information and returns an authentication result to the gateway ECU 1. The gateway ECU 1 transmits authenticated node information to the ECU (B1) 3_1, the ECU (B2) 3_2, the ECU (B3) 2_1, and the ECU (B4) 3_3 in the first layer based on the external authentication result. The relay ECU (B3) 2_1 redirects the authenticated node information received from the gateway ECU 1 to the ECU (C1) 3_4, the ECU (C2) 2_2, and the ECU (C3) 3_5 in the second layer. The relay ECU (C2) 2_2 redirects the authenticated node information received from the relay ECU (B3) 2_1 to the ECU (D) 3_6 in the third layer. Here, it can be changed so that the illegal node information is transmitted and received instead of the authenticated node information.

In this way, the external authentication of the entire apparatus (Y) 10 is completed.

An operation performed when an illegal node (an unauthentic ECU) is mixed in the authentication method described here will be described. As an example, it is assumed that the relay ECU (C2) 2_2 is an illegal node (an unauthentic ECU). The collection request and the response of the authentication information are the same as those described above, and the gateway ECU 1 combines the authentication information of the ECU (B1) 3_1, the ECU (B2) 3_2, the ECU (B3) 2_1, the ECU (B4) 3_3, the ECU (C1) 3_4, the ECU (C2) 2_2, the ECU (C3) 3_5, and the ECU (D) 3_6 and the authentication information of the gateway ECU 1, and transmits an authentication request of the combined authentication information to the authentication apparatus 7. The authentication apparatus 7 performs authentication for each piece of the received authentication information and returns an authentication result to the gateway ECU 1. In this case, the authentication information includes a result indicating that the authentication of the ECU (C2) 2_2 has failed because the ECU (C2) 2_2 is an illegal device and results indicating that the authentication of the other ECUs has succeeded.

The gateway ECU 1 that receives the authentication results from the authentication apparatus 7 refers to the authentication results and transmits illegal node information to the ECUs where the authentication has succeeded among the ECU (B1) 3_1, the ECU (B2) 3_2, the ECU (B3) 2_1, and the ECU (B4) 3_3 in the first layer. In this example, the authentication of each ECU in the first layer has succeeded, so that the gateway ECU 1 transmits the illegal node information to all the ECUs in the first layer. The relay ECU (B3) 2_1 refers to the illegal node information received from the gateway ECU 1 and transmits the illegal node information to the ECUs where the authentication has succeeded among the ECU (C1) 3_4, the ECU (C2) 2_2, and the ECU (C3) 3_5 in the second layer. In this example, the authentication of the ECU (C1) 3_4 and the ECU (C3) 3_5 has succeeded, so that the relay ECU (B3) 2_1 transmits the illegal node information to the ECU (C1) 3_4 and the ECU (C3) 3_5. However, the authentication of the relay ECU (C2) 2_2 has failed, so that the relay ECU (B3) 2_1 disconnects communication with the relay ECU (C2) 2_2. As a result, the illegal node information is not transmitted to the ECU (D) 3_6 lower than the relay ECU (C2) 2_2 and the ECU (D) 3_6 cannot communicate with the other ECUs regardless of whether the ECU (D) 3_6 is authentic or unauthentic.

Subsequently, the gateway ECU 1 transmits authenticated node information to the ECU (B1) 3_1, the ECU (B2) 3_2, the ECU (B3) 2_1, and the ECU (B4) 3_3 in the first layer. The relay ECU (B3) 2_1 that receives the authenticated node information from the gateway ECU 1 redirects the authenticated node information to the ECU (C1) 3_4 and the ECU (C3) 3_5 except for the ECU (C2) 2_2 that is notified as an illegal node. Although the authenticated node information includes the ECU (D) 3_6 at this time, each node cannot communicate with the ECU (D) 3_6, so that each node may discard information of the ECU (D) 3_6 if determining that the information is unnecessary.

As described above, when the external authentication (authentication using the white list) of the ECU (C2) 2_2 has failed, the other devices are notified that the ECU (C2) 2_2 is not a normal device and are caused to disconnect the communication with the ECU (C2) 2_2. Further, it is not possible to guarantee the safety of the communication through the ECU (C2) 2_2, so that the communication with the ECU (D) 3_6 coupled in a layer lower than the ECU (C2) 2_2 is not performed. However, when the apparatus (Y) 10 is a vehicle and each ECU is an in-vehicle electronic control unit, it is considered that the vehicle becomes unable to travel if communication is disconnected without exception. Therefore, it may be configured to ask a user (a driver of the vehicle) whether or not to disconnect communication with an ECU that is determined to be illegal, and to maintain the communication with the ECU that is determined to be illegal depending on an instruction of the user.

As described above, even when communication between devices (ECUs) requires passing through a plurality of devices, it is possible to guarantee the safety of the entire system by securing the safety of communication step by step. Even when an illegal device is mixed in the system, the effect of the illegal device can be limited to devices belonging to a lower region that can be accessed from only the illegal device.

Further, a correspondence relationship between a hierarchical bus network that realizes the hierarchical network shown in FIG. 18 and a tree type structure using a spanning tree will be described.

Figure 19:
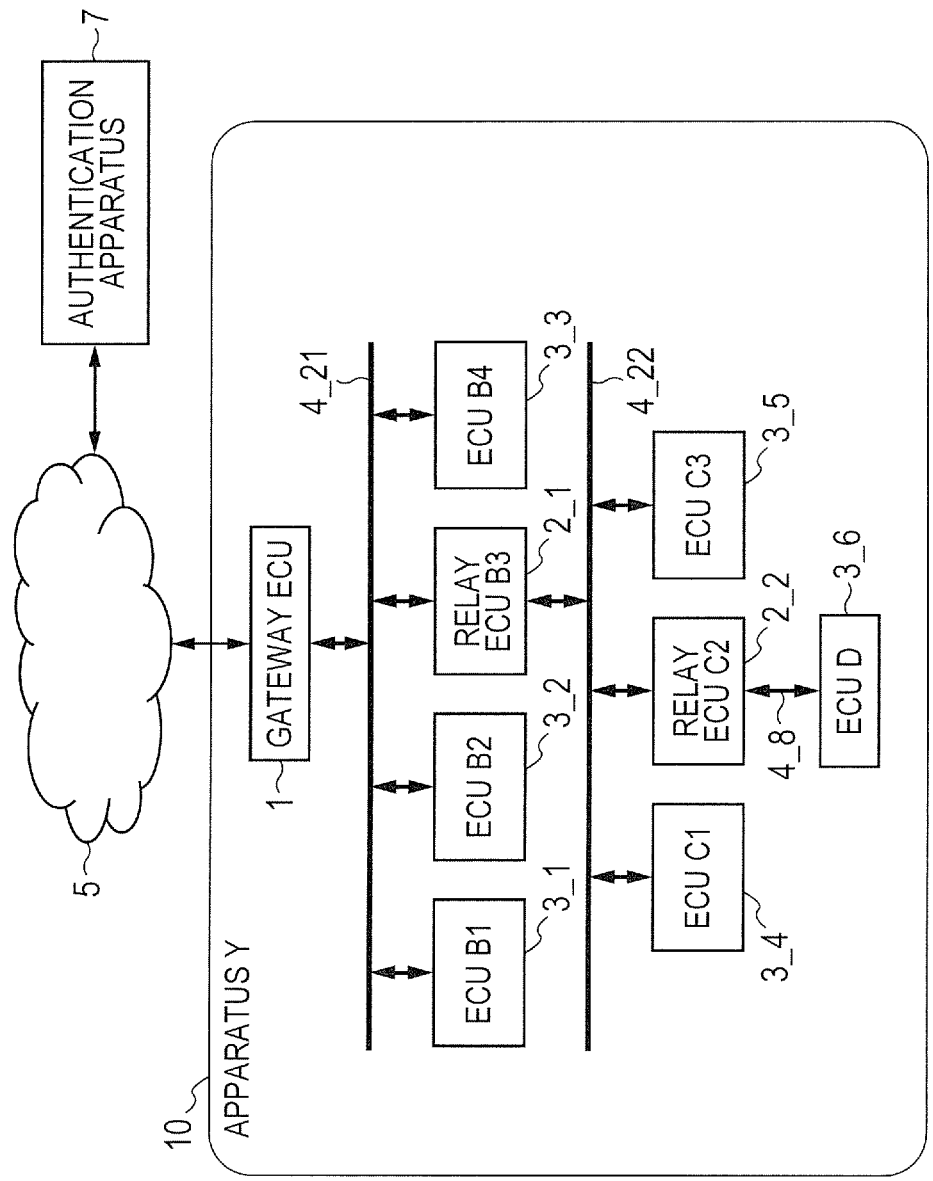
FIG. 19 is an explanatory diagram showing an example in which a hierarchical network shown in FIG. 18 is formed by a hierarchical bus network.

FIG. 19 is an explanatory diagram showing an example in which the hierarchical network shown in FIG. 18 is formed by a hierarchical bus network. In the same manner as in FIG. 18, in the apparatus (Y) 10, a plurality of ECUs including the gateway ECU 1 that can communicate with the external authentication apparatus 7 through the external network 5 are mounted, and these ECUs are hierarchically coupled by buses 4_21 and 4_22 and a one-to-one communication path 4_8, which form the hierarchical bus network inside the apparatus. The bus 4_21 mutually couples the gateway ECU 1 and the ECU (B1) 3_1, the ECU (B2) 3_2, the ECU (B3) 2_1, and the ECU (B4) 3_3 in the first layer. At this time, the ECU (B3) 2_1 is a relay apparatus (an intermediate node) to the second layer. The bus 4_22 mutually couples the relay ECU (B3) 2_1 and the ECU (C1) 3_4, the ECU (C2) 2_2, and the ECU (C3) 3_5 in the second layer. At this time, the ECU (C2) 2_2 is a relay apparatus (an intermediate node) to a lower layer. The relay ECU (C2) 2_2 and the ECU (D) 3_6, which are directly coupled by the one-to-one communication path 4_8, are the third layer of the hierarchical bus network.

Figure 20:
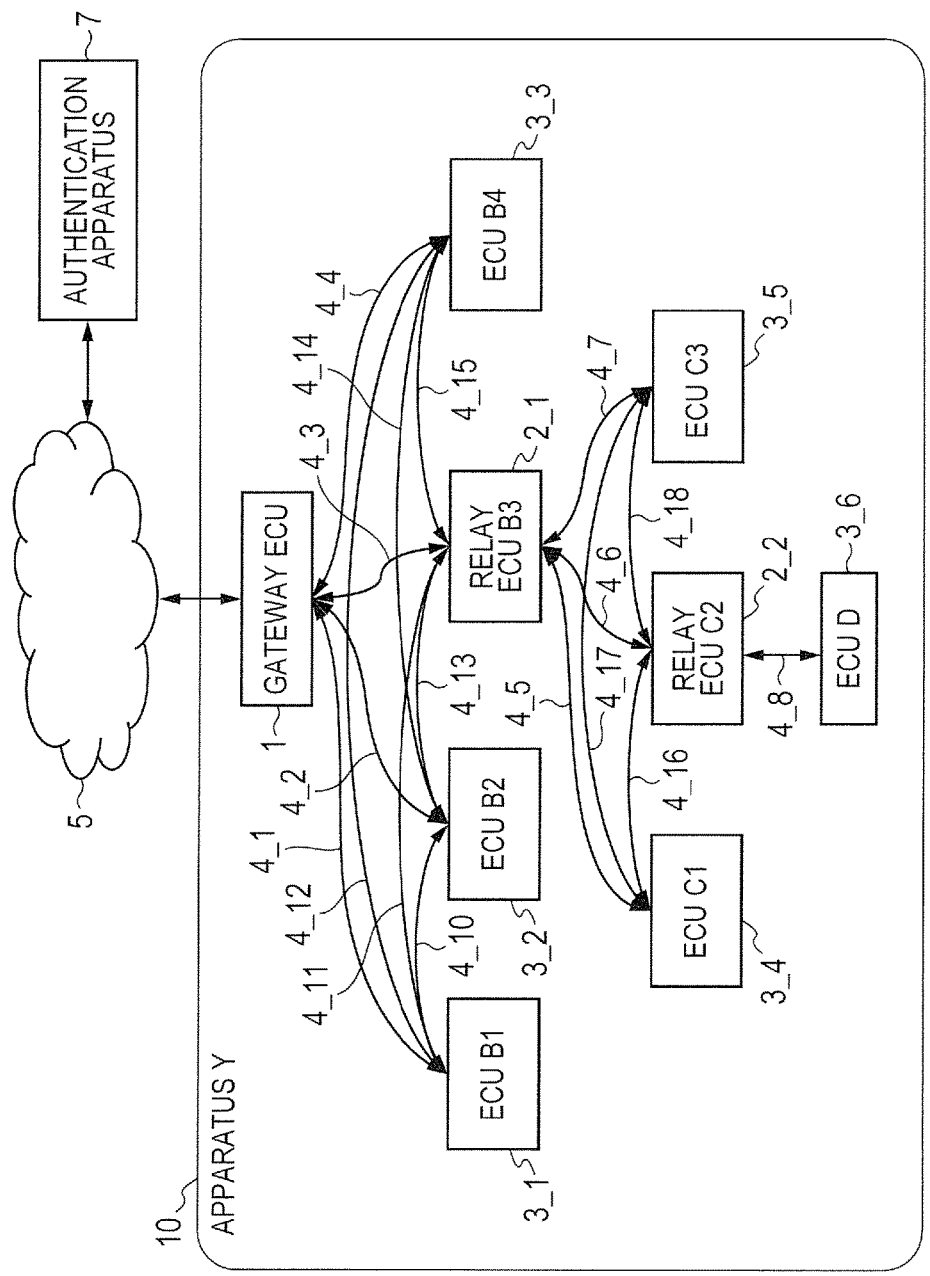
FIG. 20 is an explanatory diagram showing an example in which the hierarchical bus network shown in FIG. 19 is replaced with a network of a complete graph structure that can be identified with the hierarchical bus network.

FIG. 20 is an explanatory diagram showing an example in which the hierarchical bus network shown in FIG. 19 is replaced with a network of a complete graph structure that can be identified with the hierarchical bus network. The bus 4_21 in the first layer in FIG. 19 can be replaced with a network of a complete graph structure including the communication paths 4_1 to 4_4 and 4_10 to 4_15. The bus 4_22 in the second layer in FIG. 19 can be replaced with a network of a complete graph structure including the communication paths 4_5 to 4_7 and 4_16 to 4_18. In this way, the entire network can be assumed to be a structure in which a plurality of complete graphs are coupled by the relay ECUs. In the example shown in FIG. 20, the bus 4_21 can be identified with a complete graph with five vertexes, the bus 4_22 can be identified with a complete graph with four vertexes, and the complete graphs are coupled using the relay ECU (B3) 2_1 as a nodal point.

An operation to detect a gateway by a means such as DHCP (Dynamic Host Configuration Protocol) in a bus type network is equivalent to forming a spanning tree of a graph. As a means of forming the spanning tree, a method according to a system, such as a breadth-first search and a depth-first search may be selected in addition to the DHCP. In a system in which the configuration is fixed, it is possible to more efficiently form the spanning tree by causing each ECU to store information related to a network structure.

Figure 21:
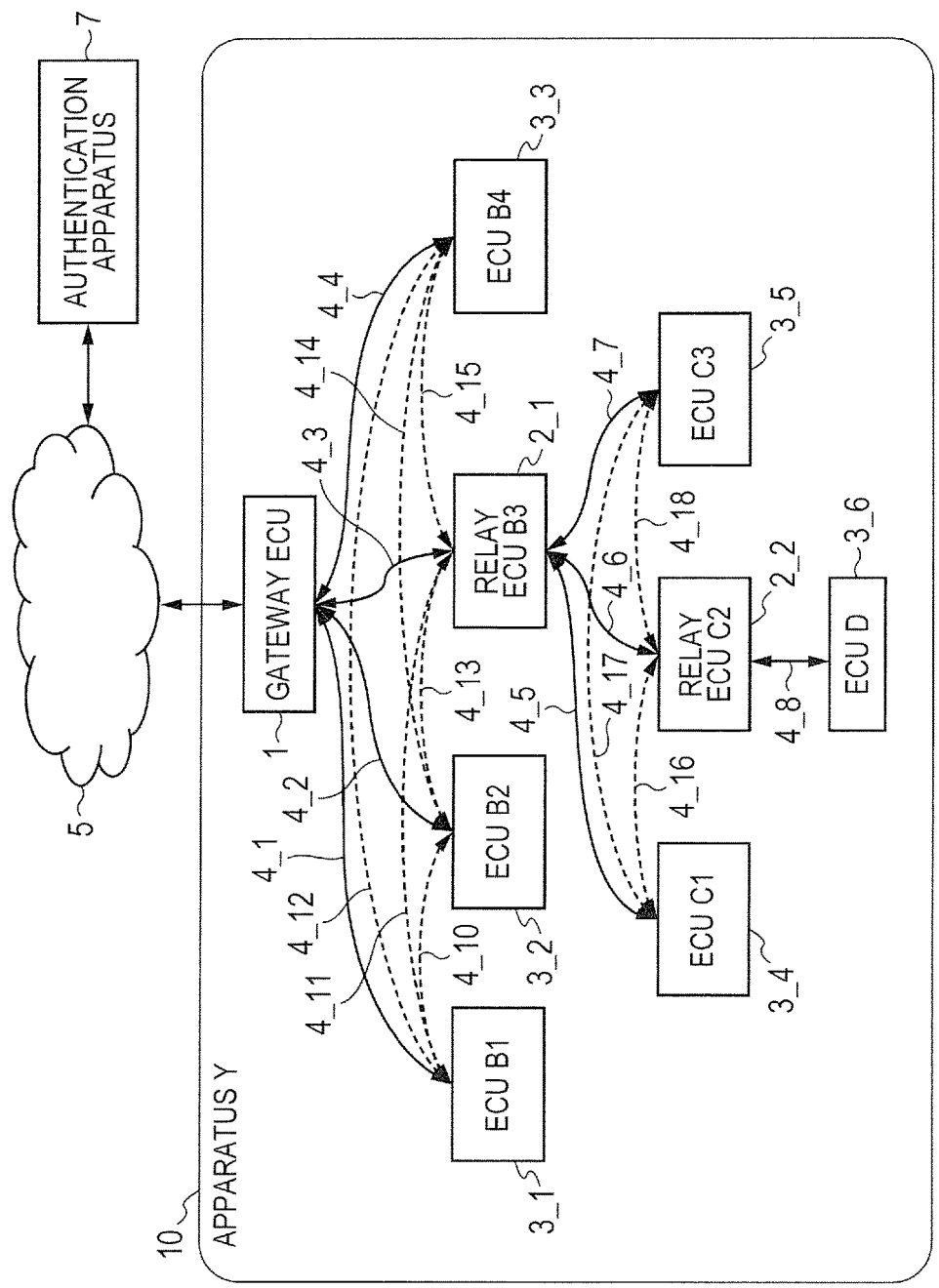
FIG. 21 is an explanatory diagram showing an example in which a spanning tree is formed by a means such as DHCP in the network of a complete graph structure shown in FIG. 20.

FIG. 21 is an explanatory diagram showing an example in which a spanning tree is formed by a means such as DHCP in the network of the complete graph structure shown in FIG. 20. The first layer results in a tree structure in which the gateway ECU 1 and the ECU (B1) 3_1, the ECU (B2) 3_2, the ECU (B3) 2_1, and the ECU (B4) 3_3 are coupled by the communication paths 4_1 to 4_3 (solid lines), respectively. The second layer results in a tree structure in which the relay ECU (B3) 2_1 and the ECU (C1) 3_4, the ECU (C2) 2_2, and the ECU (C3) 3_5 in the second layer are coupled by the communication paths 4_5 to 4_7 (solid lines), respectively. In this way, by using a spanning tree, a procedure of an external authentication in a hierarchical bus structure network can be resulted in an authentication in a tree type structure. Regarding a problem where a false spanning tree is formed by a Byzantine fault type attack, it is possible to secure safety by hypothesis assurance reasoning.

Next, a case will be described in which a legacy ECU that can communicate with only a specific ECU is coupled on a bus.

Figure 22:
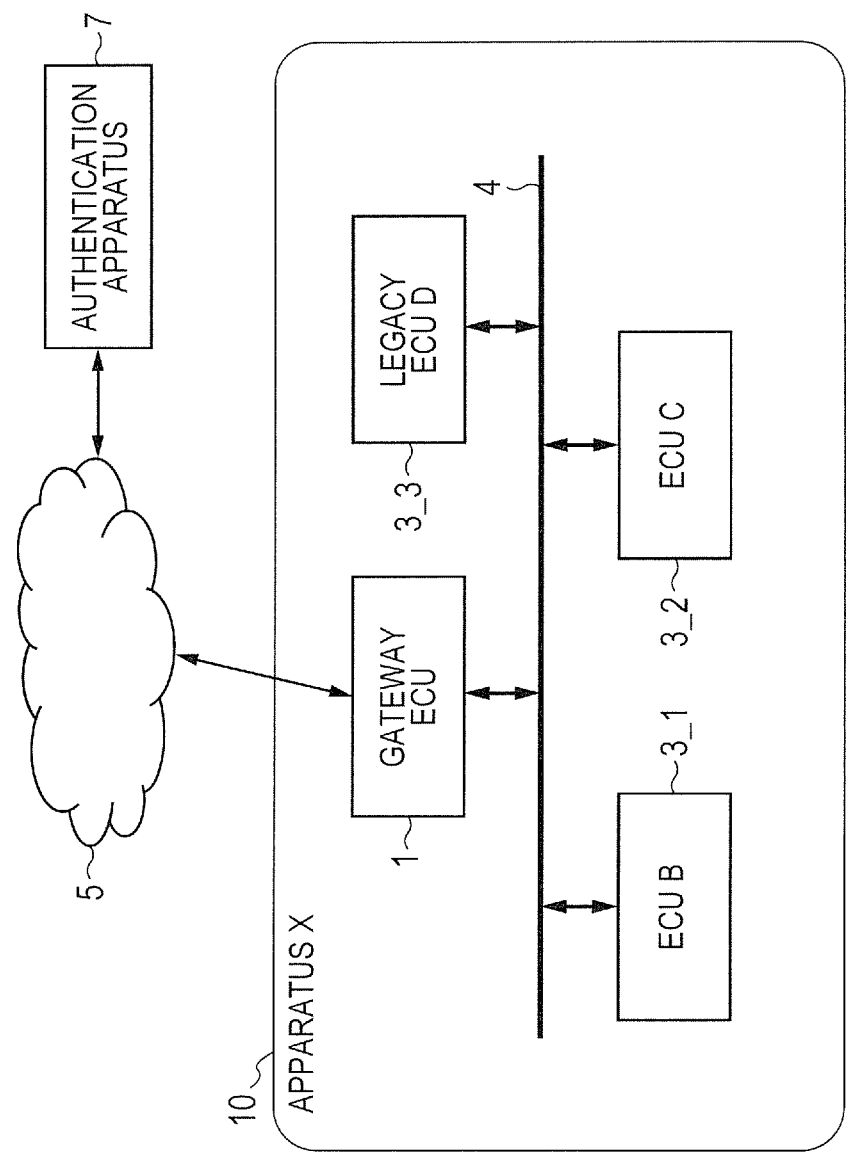
FIG. 22 is an explanatory diagram showing a configuration example of a bus type network in which a plurality of ECUs including a legacy ECU are coupled.

FIG. 22 is an explanatory diagram showing a configuration example of a bus type network in which a plurality of ECUs including a legacy ECU are coupled to. For simplifying description, the bus has only one layer, and the gateway ECU 1, the ECU (B) 3_1, the ECU (C) 3_2, and the legacy ECU (D) 3_3 are coupled to the bus 4. Although the legacy ECU (D) 3_3 is coupled to the bus 4, the legacy ECU (D) 3_3 can communicate with only the ECU (C) 3_2 and cannot communicate with the other ECUs.

Figure 23:
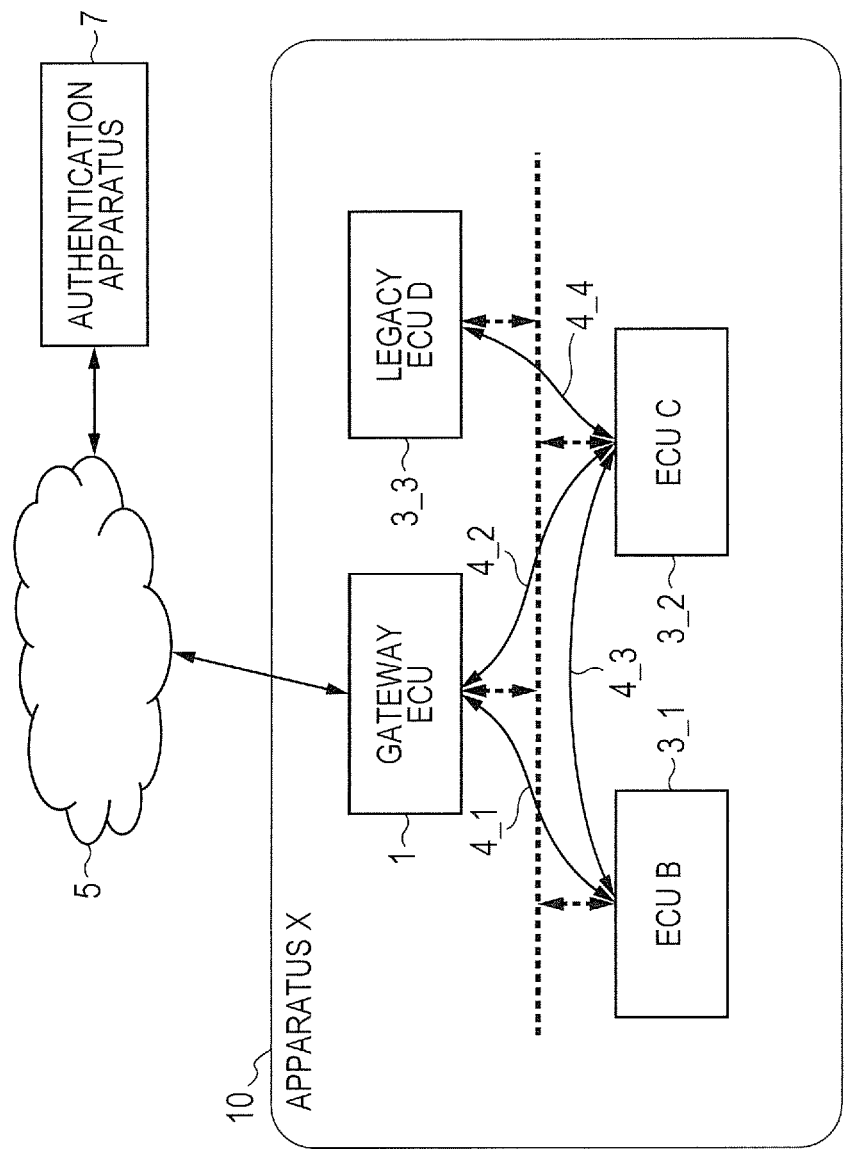
FIG. 23 is an explanatory diagram showing a network structure that can be identified with a network structure shown in FIG. 22 while considering allowable communication paths.

FIG. 23 is an explanatory diagram showing a network structure that can be identified with the network structure shown in FIG. 22 while considering allowable communication paths. The network structure in this case can be identified with a configuration in which the communication paths 4_1 to 4_3 are formed between the gateway ECU 1, the ECU (B) 3_1, and the ECU (C) 3_2 and only the communication path 4_4 is formed between the legacy ECU (D) 3_3 and the ECU (C) 3_2.

Figure 24:
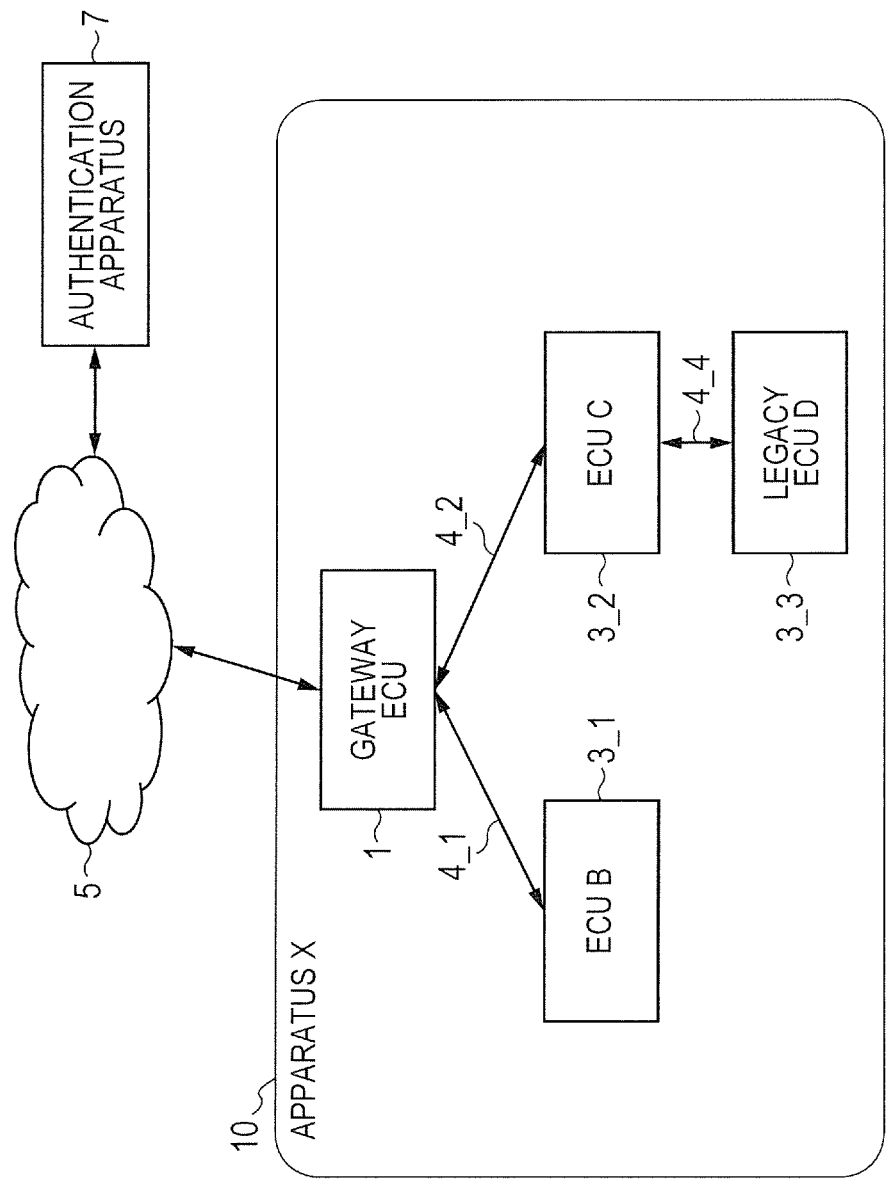
FIG. 24 is an explanatory diagram showing an example in which a spanning tree is formed for a bus type network structure shown in FIG. 23.

By forming a spanning tree of this case, a tree structure as shown in FIG. 24 is formed. The same goes for a case in which the bus is hierarchized.

As described above, also in a case in which a legacy node that can communicate with only a specific node is included in a bus, by using a spanning tree, a procedure of an external authentication in a hierarchical bus structure network can be resulted in an authentication in a tree type structure.

Fourth Embodiment <Ticket Request from Terminal>

In a fourth embodiment, an external authentication in a case where a new unauthenticated ECU is further added to an apparatus including a plurality of ECUs that have already been externally authenticated will be described.

Figure 25:
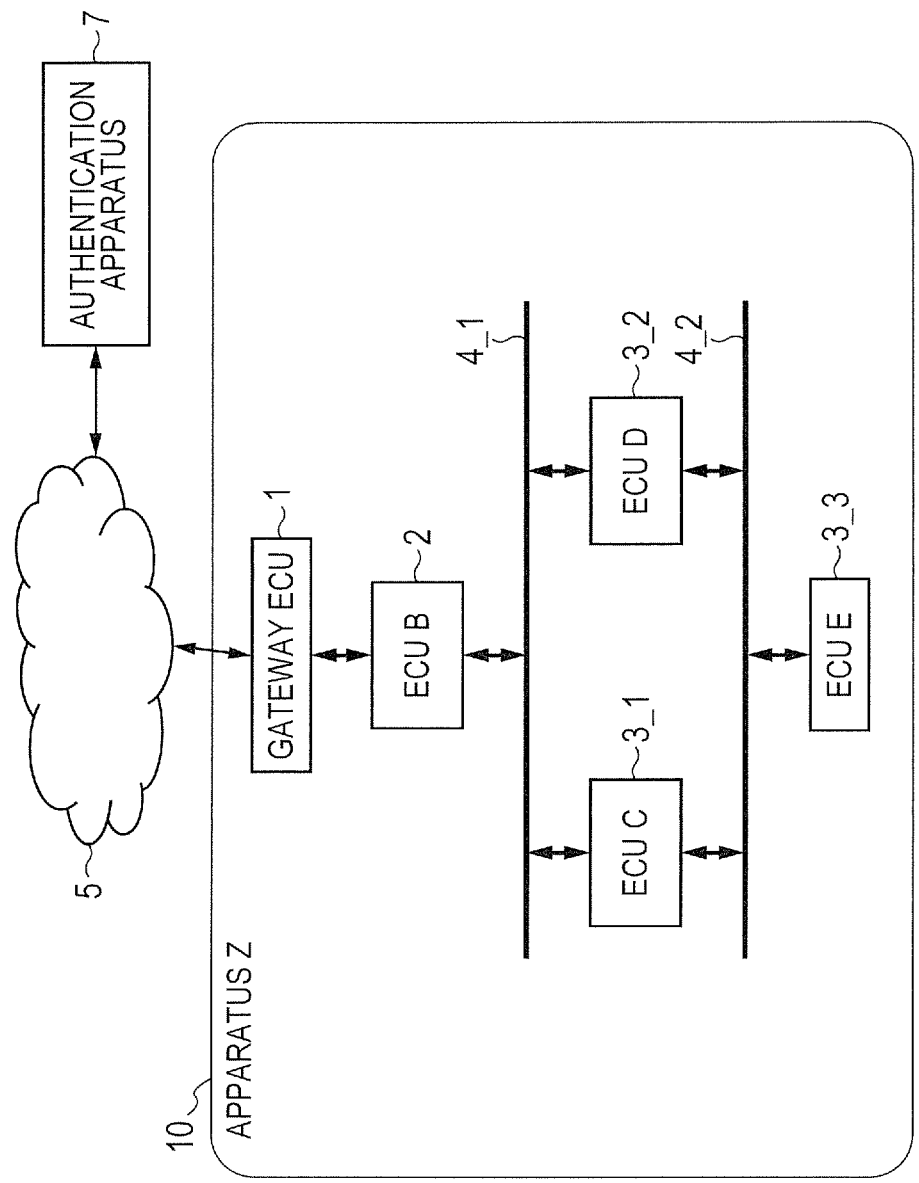
FIG. 25 is a block diagram showing a configuration example of a fourth embodiment.

FIG. 25 is a block diagram showing a system configuration example of the fourth embodiment.

In an apparatus (Z) 10 such as a vehicle, a plurality of ECUs including a gateway ECU 1 that can communicate with the external authentication apparatus 7 through the external network 5 are mounted, and these ECUs are hierarchically coupled by networks 4_1 and 4_2 such as CAN inside the apparatus. The relay ECU (B) 2_1, the ECU (C) 3_1, and the ECU (D) 3_2 are coupled by the bus 4_1 and the external authentication of these ECUs has been completed. A case will be described in which an unauthenticated ECU (E) 3_3 is newly coupled to the above through the bus 4_2.

The ECU (E) 3_3 cannot directly communicate with the network 5. Further, at a time point when the ECU (E) 3_3 is coupled to the apparatus (Z), the ECU (E) 3_3 does not have information related to validity of the ECU (C) 3_1 and the ECU (D) 3_2, which are directly coupled to the ECU (E) 3_3, the relay ECU (B) 2_1 coupled through the ECU (C) 3_1 and the ECU (D) 3_2, and the gateway ECU 1 in an upper layer of the relay ECU (B) 2_1. In this state, if the ECU (E) 3_3 receives notifications, which relate to illegal node information and authenticated node information and which contradict each other, respectively from the ECU (C) 3_1 and the ECU (D) 3_2 coupled to the ECU (E) 3_3, the ECU (E) 3_3 cannot determine which notification is reliable unless the ECU (E) 3_3 is given reliable information in advance.

Here, it is assumed that the external authentication of the gateway ECU 1, the relay ECU (B) 2_1, and the ECU (C) 3_1 has succeeded and the external authentication of the ECU (D) 3_2 has failed.

After the ECU (E) 3_3 starts an operation, the ECU (E) 3_3 requests a ticket from both the ECU (C) 3_1 and the ECU (D) 3_2 which are directly coupled to the ECU (E) 3_3. Here, the ticket is information that can be generated by only an authentication apparatus that shares authentication information such as a unique ID and a unique key of the ECU (E) 3_3. The ticket includes an encrypted text that can be generated by only an apparatus of supply source of the ECU (E) 3_3. The ECU (E) 3_3 can confirm that the ticket is normally and reliably transmitted through an external network by decrypting and verifying the ticket.

A ticket acquisition request transmitted to the ECU (C) 3_1 is redirected to the relay ECU (B) 2_1, is further redirected to the gateway ECU 1, and is transmitted to the authentication apparatus 7 from the gateway ECU 1 through the network 5. The authentication apparatus 7 generates a ticket of the ECU (E) 3_3 based on authentication information of the ECU (E) 3_3 held by the authentication apparatus 7. When the authentication apparatus 7 cannot generate the ticket, the authentication apparatus 7 transmits a ticket acquisition request to a supply source authentication apparatus of the ECU (E) 3_3 based on the authentication information of the ECU (E) 3_3, the ticket of the ECU (E) 3_3 is generated by the supply source authentication apparatus, and the ticket may be transmitted to the authentication apparatus 7.

On the other hand, the external authentication of the ECU (D) 3_2 has failed, so that communication of the ECU (D) 3_2 is disconnected by the relay ECU (B) 2_1. Therefore, the ECU (D) 3_2 cannot redirect the ticket acquisition request to upper nodes such as the relay ECU (B) 2_1.

The ticket generated by the authentication apparatus 7 or the supply source authentication apparatus of the ECU (E) 3_3 is transmitted from the authentication apparatus 7 to the gateway ECU 1 through the network 5, is redirected from the gateway ECU 1 to the relay ECU (B) 2_1, and is further redirected to the ECU (C) 3_1. The communication to the ECU (D) 3_2 is disconnected, so that the ticket is not transmitted to the ECU (D) 3_2 from the relay ECU (B) 2_1. As a result, the ticket is transmitted from the ECU (C) 3_1 to the ECU (E) 3_3, but is not transmitted from the ECU (D) 3_2.

The ECU (E) 3_3 confirms that the ticket is normally and reliably transmitted through an external network by decrypting and verifying the ticket. From among the ECU (C) 3_1 and the ECU (D) 3_2 that transmit the ticket acquisition request, the ECU (E) 3_3 recognizes the ECU (C) 3_1 that returns the ticket as an authentic device and establishes communication with the ECU (C) 3_1. On the other hand, the ECU (E) 3_3 determines the ECU (D) 3_2 as an unauthentic device and disconnects communication with the ECU (D) 3_2. However, when the apparatus (Z) 10 is a vehicle and each ECU is an in-vehicle electronic control unit, it is considered that the vehicle becomes unable to travel if communication is disconnected without exception. Therefore, it may be configured to ask a user (a driver of the vehicle) whether or not to disconnect communication with an ECU that is determined to be illegal, and to maintain the communication with the ECU that is determined to be illegal depending on an instruction of the user.

Thereby, even when a device (the ECU (E) 3_3) cannot directly communicate with outside of the system, the device (the ECU (E) 3_3) can verify the validity of a device to which the device (the ECU (E) 3_3) is coupled and the system.

Fifth Embodiment <Distributed Hash>

In a fifth embodiment, an embodiment will be described in which an apparatus V (10) has a communication path including a legacy P2P network that does not have a mutual authentication function.

Figure 26:
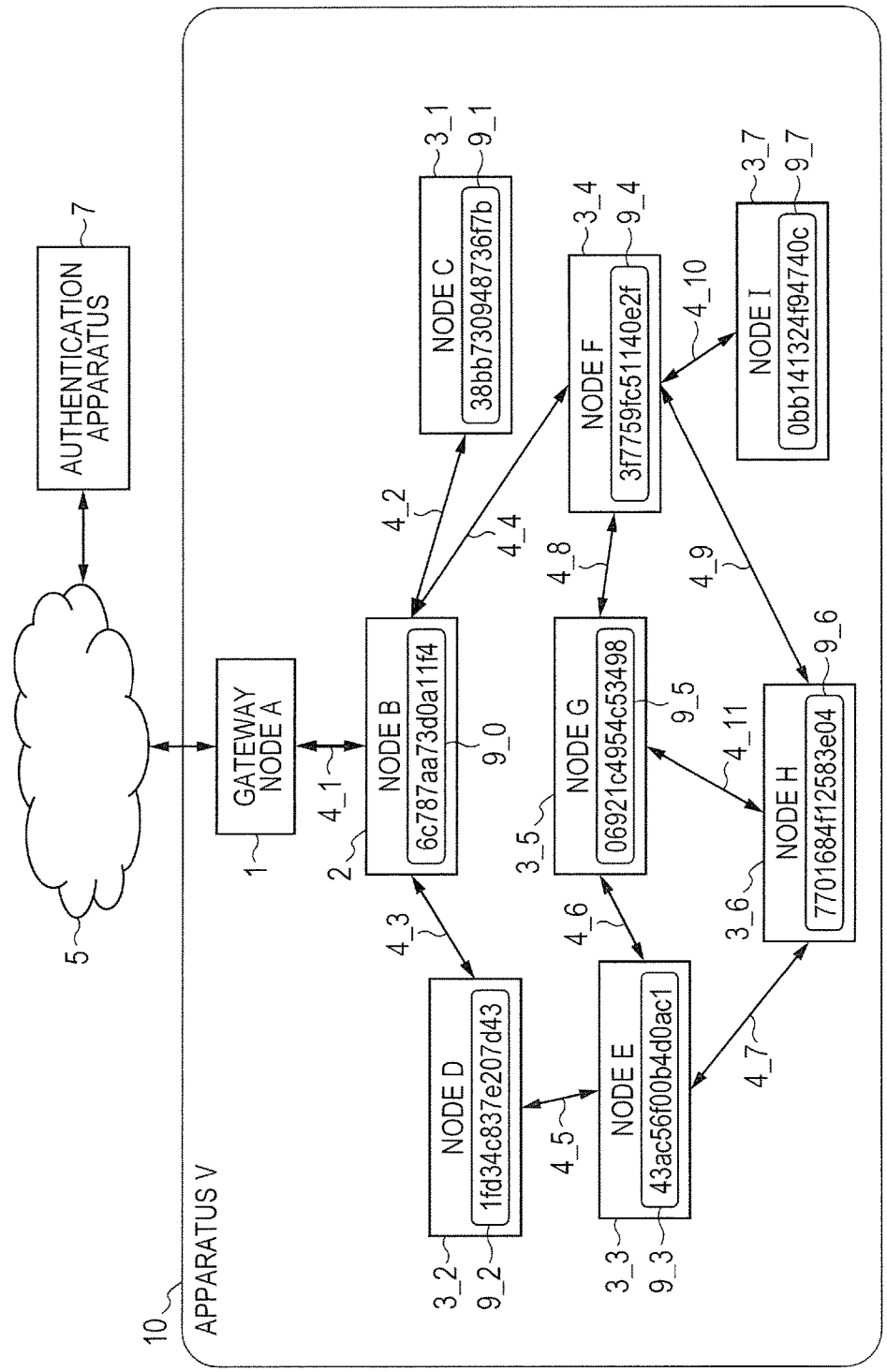
FIG. 26 is a block diagram showing a configuration example of a fifth embodiment.

FIG. 26 is a block diagram showing a system configuration example of the fifth embodiment.

In the apparatus V (10), a gateway node A (1) that can communicate with the external authentication apparatus 7 through the external network 5, a relay node B (2), and the other nodes C to I (3_1 to 3_7) are mounted, and these nodes are hierarchically coupled by an internal networks 4 including network paths 4_1 to 4_11. In the following description, it is assumed that a mutual authentication is established between the gateway node A (1) and the relay node B (2) which are coupled by the communication path 4_1 and communication paths between the relay node B (2) and the other nodes C to I (3_1 to 3_7) and communication paths between the other nodes are a legacy P2P network which does not have a mutual authentication function. Although some of the nodes C to I (3_1 to 3_7) may function as a relay node for another node, these nodes do not necessarily have "relay" in their names.

In the same manner as the embodiments described above, the present embodiment can also be realized by defining that the apparatus V (10) is a vehicle and each node is an ECU. The gateway node A (1) and the relay node B (2) can be externally authenticated in the same manner as in the embodiments described above.

Unique distributed hash values 9_0 to 9_7 are respectively assigned to the relay node B (2) and the other nodes C to I (3_1 to 3_7) that do not have the mutual authentication function. In a legacy P2P network, communication between nodes is performed depending on the distributed hash values. For example, when the node B (2) communicates with the node H (3_6), the node B (2) searches for a path by using the distributed hash value 9_6 of the node H (3_6). In this case, the node E (3_3), the node F (3_4), and the node G (3_5) are directly coupled to the node H (3_6), so that the node E (3_3), the node F (3_4), and the node G (3_5) can relay communication to the node H (3_6). The node B (2) transmits data, to which the distributed hash value 9_6 of the node H (3_6) which is a communication destination is given, to the node C (3_1), the node D (3_2), and the node F (3_4) that are directly coupled to the node B (2). The node C (3_1) does not respond because the node C (3_1) has the distributed hash value 9_1 different from the received distributed hash value 9_6 and does not redirect the data because the node C (3_1) is the end of the network. The node D (3_2) does not respond because the node D (3_1) has the distributed hash value 9_2 different from the received distributed hash value 9_6, but redirects the data to the node E (3_3) that is directly coupled to the node D (3_2) because the node C (3_1) is not the end of the network. The node F (3_4) does not respond because the node F (3_4) has the distributed hash value 9_4 different from the received distributed hash value 9_6, but redirects the data to the node G (3_5), the node H (3_6), and the node I (3_7) that are directly coupled to the node F (3_4) because the node F (3_4) is not the end of the network. The node H (3_6) responds to the node F (3_4) because the received distributed hash value 9_6 corresponds to the distributed hash value 9_6 of the node H (3_6) itself, and the node F (3_4) redirects the response to the node B (2). In the same manner, the communication between the node B (2) and the node H (3_6) can be established in a path of node B (2)-node D (3_2)-node E (3_3)-node H (3_6), in a path of node B (2)-node D (3_2)-node E (3_3)-node G (3_5)-node H (3_6), and in a path of node B (2)-node F (3_4)-node G (3_5)-node H (3_6).

Even when the network 4 has a general graph structure in this way, it is possible to authenticate all the nodes on the network by forming a spanning tree of the graph in advance and performing hierarchical authentication on the spanning tree.

Figure 27:
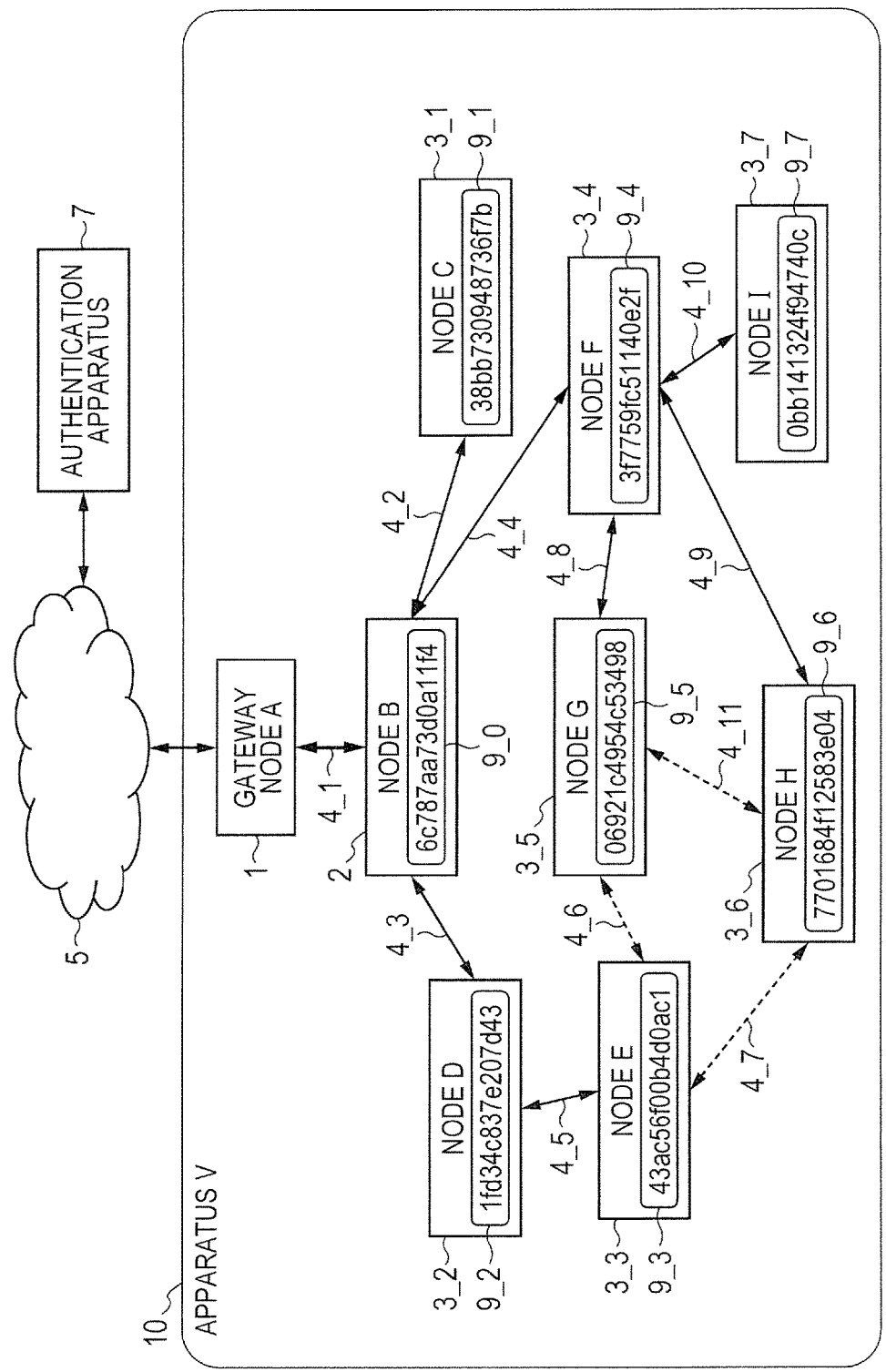

FIG. 27 is an explanatory diagram showing an example in which the network having a general graph structure shown in FIG. 26 is formed by a breadth-first search or the like. A spanning tree formed by the breadth-first search is shown by solid lines 4_2, 4_3, 4_4, 4_5, 4_8, 4_9, and 4_10 in FIG. 27. However, there may be a plurality of methods for forming the spanning tree and a plurality of structures of the spanning tree in addition to the methods and structures shown in the drawings. When a spanning tree of the network can be formed, it is possible to apply the device authentication in the hierarchical network as described in the third embodiment. Specifically, after the apparatus (V) 10 starts up, the gateway node A (1) performs local mutual coupling authentication with the intermediate node B (2) and establishes a coupling. Around that time, the gateway node A (1) transmits an ID and a unique key, which are authentication information of the gateway ECU 1 and which are in an encrypted state, to the authentication apparatus 7 and receives an authentication result. Subsequently, the gateway node A (1) requests the relay node B (2) to collect authentication information.

The relay node B (2) that is requested to collect authentication information requests the node C (3_1), the node D (3_2), and the node F (3_4), which are directly coupled to the relay node B (2), to collect authentication information. Here, the communication between the relay node B (2) and each node does not have a local mutual authentication means. However, it is possible to perform the communication by using the distributed hash value assigned to each node. The relay node B (2) requests the node C (3_1), the node D (3_2), and the node F (3_4) to collect authentication information by sending the distributed hash values 9_1, 9_2, and 9_4 respectively assigned to the node C (3_1), the node D (3_2), and the node F (3_4) to the node C (3_1), the node D (3_2), and the node F (3_4), respectively. The node C (3_1) responds to the request and transmits the authentication information of the node C (3_1) to the relay node B (2). The relay node B (2) stores the received authentication information of the node C (3_1) and waits for response from the other nodes. The node D (3_2) is a relay node, so that the node D (3_2) redirects the collection request of authentication information to the node E (3_3). The node E (3_3) is a terminal node in the formed spanning tree, so that the node E (3_3) transmits its own authentication information to the node D (3_2) as a response. The node D (3_2) transmits the received authentication information of the node E (3_3) and its own authentication information to the relay node B (2) as a response. The relay node B (2) stores the received authentication information of the node D (3_2) and the node E (3_3) and waits for response from the other nodes. The node F (3_4) is also a relay node, so that the node F (3_4) redirects the collection request of authentication information to the node G (3_5), the node H (3_6), and the node I (3_7). Each of the node G (3_5), the node H (3_6), and the node I (3_7) is a terminal node in the formed spanning tree, so that each node returns its own authentication information to the node F (3_4) as a response. The node F (3_4) transmits the received authentication information of the node G (3_5), the node H (3_6), and the node I (3_7) and its own authentication information to the relay node B (2) as a response. The relay node B (2) transmits the stored authentication information of the node C (3_1), the node D (3_2), and the node E (3_3), the received authentication information of the node G (3_5), the node H (3_6), the node I (3_7), and the node F (3_4), and its own authentication information to the gateway node A (1) as a response. The gateway node A (1) transmits the received authentication information of the relay node B (2), the node C (3_1), the node D (3_2), the node E (3_3), the node G (3_5), the node H (3_6), the node I (3_7), and the node F (3_4) to the authentication apparatus 7 through the network 5 and requests authentication of each of the plurality of nodes.

The authentication apparatus 7 performs authentication for each piece of the received authentication information and returns a result to the gateway node A (1). When the relay node B (2) is authenticated as authentic in the authentication result, the gateway node A (1) transmits the authentication result to the relay node B (2). The relay node B (2) transmits authenticated node information or illegal node information based on the authentication result to each node in the lower layers through the same paths as those used for the collection request of the authentication information. Each node that receives the authenticated node information or the illegal node information continues communication when a communication partner is an authentic node but disconnects communication when a communication partner is an illegal node based on the received authenticated node information or illegal node information.

Next, a case will be described in which an illegal/enemy node is mixed in a network and a wrong spanning tree is formed. In the description, it is assumed that the node D (3_2) is an illegal node.

Figure 28:
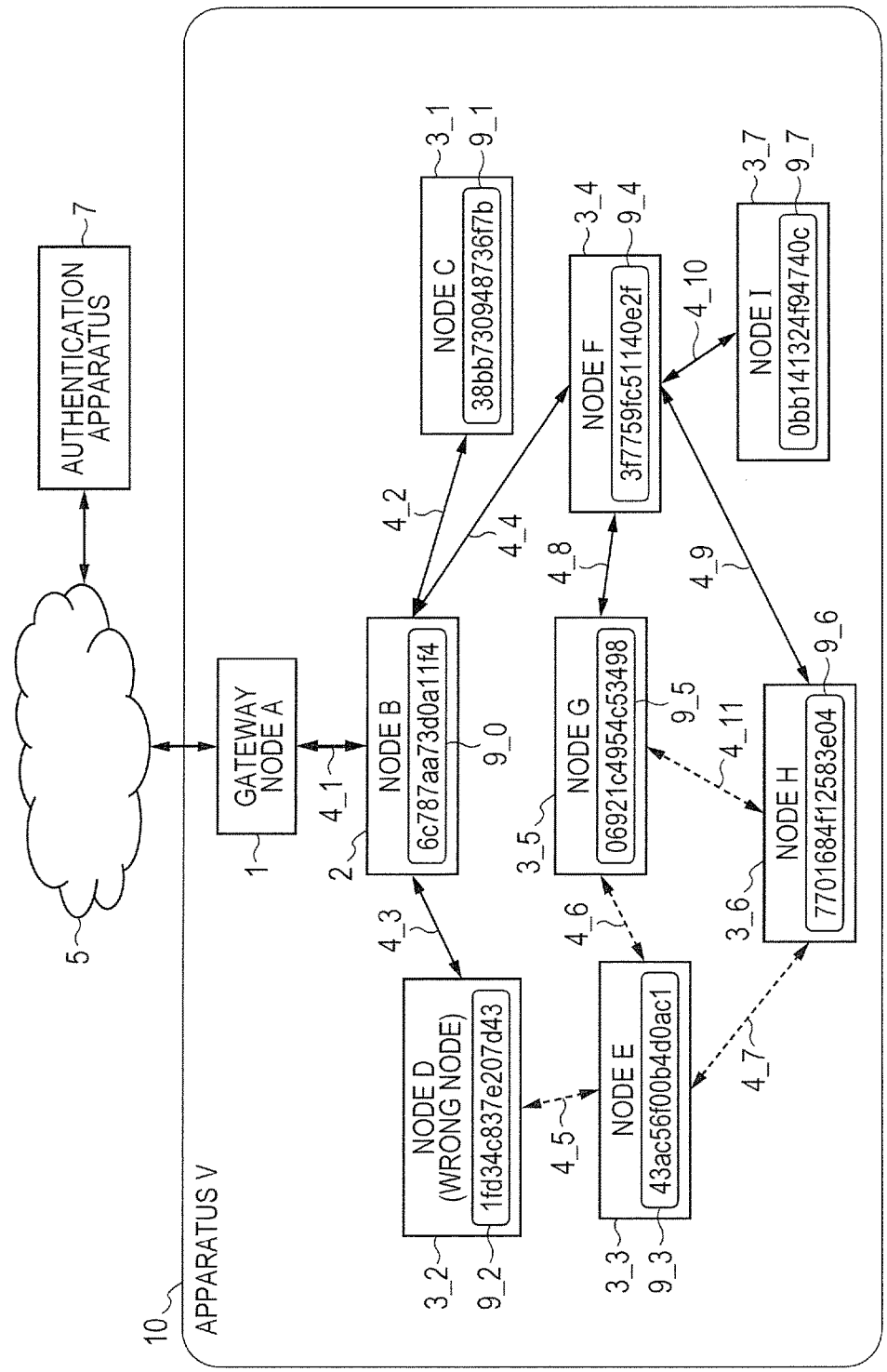
FIG. 28 is an explanatory diagram showing an example of a spanning tree formed by false information due to an illegal node, which is a node D in FIG. 27.

FIG. 28 is an example of a spanning tree formed by false information due to an illegal node, which is the node D (3_2) in FIG. 27. The node E (3_3) is removed from an authentication tree by the false information due to the node D (3_2) which is an illegal node. This situation is generated by, for example, an operation in which the node D (3_2) pretends to be the node G (3_5) and an operation in which the node D (3_2) discards information of the node E (3_3) regardless that the node E (3_3) determines the node D (3_2) as an upper node.

In this situation, in the same manner as the authentication processing described above, after the apparatus V (10) starts up, the gateway node A (1) performs local mutual coupling authentication with the relay node B (2) to establish coupling, and around that time, transmits an ID and a unique key, which are its own authentication information and which are in an encrypted state, to the authentication apparatus 7, and receives an authentication result. Subsequently, the gateway node A (1) requests the intermediate node B (2) to collect authentication information.

The relay node B (2) that is requested to collect authentication information requests the node C (3_1), the node D (3_2), and the node F (3_4), which are directly coupled to the relay node B (2), to collect authentication information. The relay node B (2) requests the node C (3_1), the node D (3_2), and the node F (3_4) to collect authentication information by sending the distributed hash values 9_1, 9_2, and 9_4 respectively assigned to the node C (3_1), the node D (3_2), and the node F (3_4) to the node C (3_1), the node D (3_2), and the node F (3_4), respectively. The node C (3_1) responds to the request and transmits the authentication information of the node C (3_1) to the relay node B (2). The relay node B (2) stores the received authentication information of the node C (3_1) and waits for response from the other nodes. The node D (3_2) is an illegal node and makes itself a network terminal of the spanning tree, so that the node D (3_2) transmits its own authentication information to the relay node B (2) as a response without redirecting the collection request of authentication information to the node E (3_3). The relay node B (2) stores the received authentication information of the node D (3_2) and waits for response from the other nodes. The node F (3_4) is a relay node, so that the node F (3_4) redirects the collection request of authentication information to the node G (3_5), the node H (3_6), and the node I (3_7). Each of the node G (3_5), the node H (3_6), and the node I (3_7) is a terminal node in the formed spanning tree, so that each node returns its own authentication information to the node F (3_4) as a response. The node F (3_4) transmits the received authentication information of the node G (3_5), the node H (3_6), and the node I (3_7) and its own authentication information to the relay node B (2) as a response. The relay node B (2) transmits the stored authentication information of the node C (3_1) and the node D (3_2), the received authentication information of the node G (3_5), the node H (3_6), the node I (3_7), and the node F (3_4), and its own authentication information to the gateway node A (1) as a response. The gateway node A (1) transmits the received authentication information of the relay node B (2), the node C (3_1), the node D (3_2), the node G (3_5), the node H (3_6), the node I (3_7), and the node F (3_4) to the authentication apparatus 7 through the network 5 and requests authentication of each of the plurality of nodes.

The authentication apparatus 7 performs authentication for each piece of the received authentication information and returns a result to the gateway node A (1). When the relay node B (2) is authenticated as authentic in the authentication result, the gateway node A (1) transmits the authentication result to the relay node B (2). The relay node B (2) transmits authenticated node information or illegal node information based on the authentication result to each node in the lower layers through the same paths as those used for the collection request of the authentication information. Each node that receives the authenticated node information or the illegal node information continues communication when a communication partner is an authentic node but disconnects communication when a communication partner is an illegal node based on the received authenticated node information or illegal node information. Here, based on the authentication result indicating that the node D (3_2) is an illegal node, the relay node B (2) disconnects communication with the node D (3_2) and transmits the authenticated node information or the illegal node information based on the authentication result to each adjacent node except for the node D (3_2). Thereby, the node D (3_2), which is an illegal node, is separated from the network.

Subsequently, the spanning tree is re-formed in a state in which the node D (3_2), which is an illegal node, is excluded.

Figure 29:
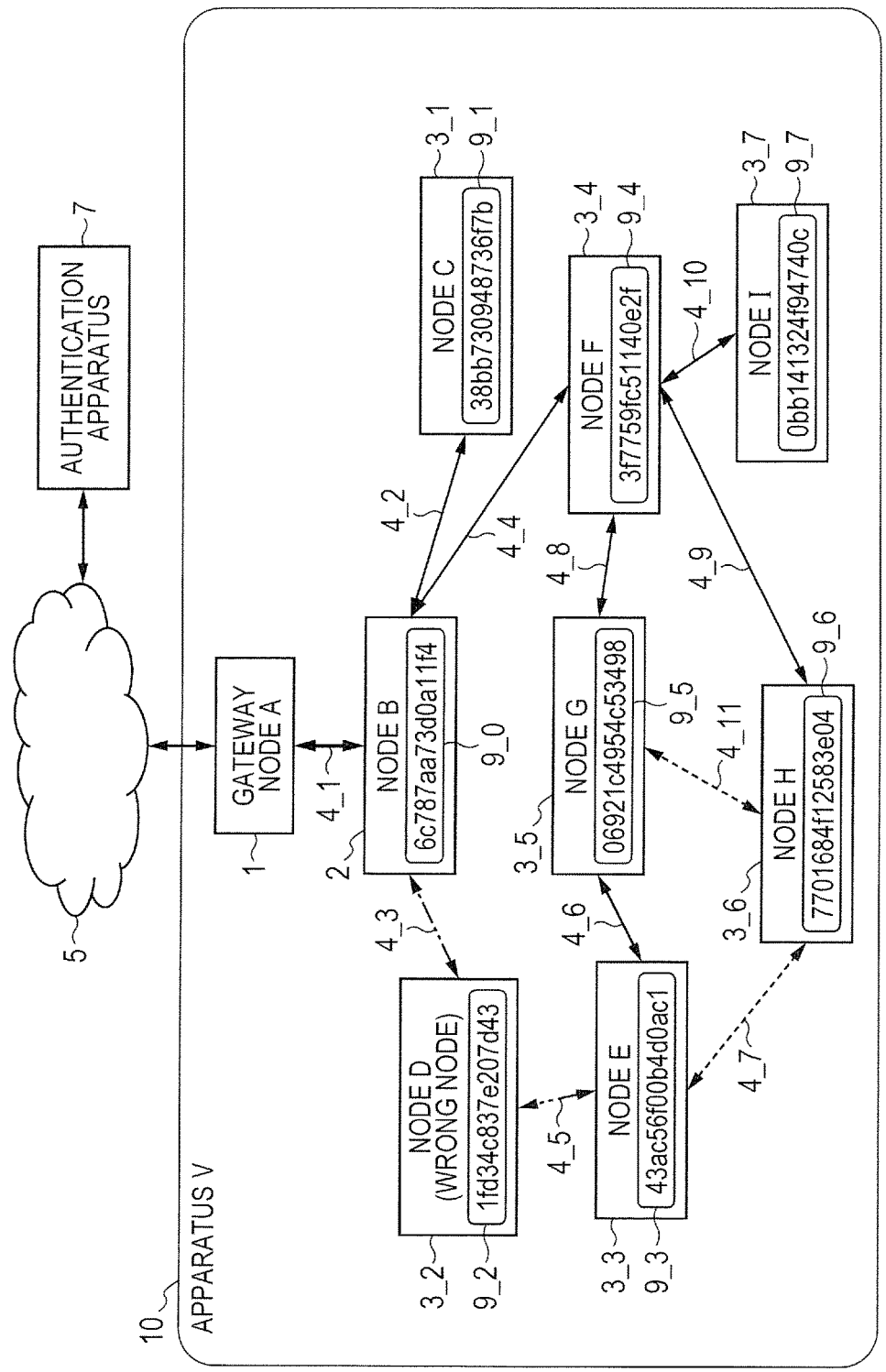
FIG. 29 is an example of a spanning tree that is re-formed in a state in which the illegal node is excluded.

FIG. 29 is an example of a spanning tree that is re-formed in a state in which the illegal node D (3_2) is excluded. The communication paths 4_3 and 4_5 to the node D (3_2), which is an illegal node, are disconnected. In FIG. 27, the communication path 4_5 of the node E (3_3), which is positioned as a lower node of the node D (3_2), to the node D (3_2) is disconnected, so that the node E (3_3) becomes an object to be searched from the node F (3_4) and, for example, is positioned as a lower node of the node G (3_5). When the authentication information is collected again along the re-formed spanning tree, the authentication processing for all the nodes including the node E (3_3) is performed. If an illegal node is newly detected, an operation in which the illegal node is excluded, the spanning tree is re-formed, and thereafter the authentication is performed again is repeatedly performed until no illegal node is newly detected, so that it is possible to reconstruct a network including only nodes that are externally authenticated.

As described above, even on a P2P network in which an illegal node may be mixed, it is possible to perform collection of authentication information by giving a distributed hash value to each node so that nodes coupled to each other can safely communicate with each other. The given distributed hash value can be authentication information along with an ID unique to each node. When a certain illegal node does not respond to a collection request of a distributed hash value and a unique ID which are authentication information, the distributed hash value of the illegal node is not included in a list of authenticated nodes, so that the illegal node cannot establish communication with the other nodes and an external network. Even if the illegal node correctly responds to the collection request and returns a distributed hash value, the illegal node fails in the white list authentication using a unique ID, so that the communication is not established. Thereby, it is possible to exclude a node that behaves in a manner like a Byzantine fault from the P2P network.

While the invention made by the inventors has been specifically described based on the embodiments, it is needless to say that the present invention is not limited to the embodiments and may be variously modified within the scope of the invention.

What is claimed is:

1. A relay apparatus configured to communicate with an authentication apparatus and to be coupled to a communication path to which other apparatuses are coupled, the relay apparatus comprising:
   a central processing unit;
   a memory storing unique authentication information for the relay apparatus; and
   an external interface configured for communication with the authentication apparatus and other apparatuses,
   wherein the other apparatuses have respective unique authentication information,
   wherein the authentication apparatus has a function of apparatus authentication that determines whether or not the relay apparatus and the other apparatuses are authentic apparatuses based on the authentication information, and
   wherein the relay apparatus transmits its own authentication information to the authentication apparatus through the external interface, collects the authentication information from the other apparatuses coupled to the communication path and transmits the authentication information to the authentication apparatus, receives a result of the apparatus authentication from the authentication apparatus through the external interface, shuts down communication between itself and an apparatus determined to be unauthentic based on the result, and transmits communication control information including identifiers for at least some of the other apparatuses to the apparatuses determined to be authentic, from among the other apparatuses having the respective authentication information, to cause the apparatuses determined to be authentic to shut down communication with the apparatus determined to be unauthentic.

2. The relay apparatus according to claim 1,
   wherein the relay apparatus performs mutual authentication with the other apparatuses before collecting authentication information from the other apparatuses.

3. The relay apparatus according to claim 2,
   wherein the authentication information is an identifier unique to each apparatus and a unique key shared by the apparatus and the authentication apparatus,
   wherein the relay apparatus transmits an identifier and a unique key, which are encrypted, to the authentication apparatus,
   wherein the relay apparatus collects identifiers and unique keys, which are encrypted, respectively from the other apparatuses coupled to the communication path and transmits the identifiers and unique keys to the authentication apparatus, and
   wherein the apparatus authentication performed by the authentication apparatus includes a function to decrypt the encrypted identifiers and determine whether or not the relay apparatus and the other apparatuses are authentic apparatuses based on the decrypted identifiers.

4. The relay apparatus according to claim 1,
wherein distributed hash values respectively associated with the relay apparatus and the other apparatuses as the authentication information are supplied to the relay apparatus and the other apparatuses, respectively,
wherein the relay apparatus transmits the distributed hash value associated with itself to the authentication apparatus,
wherein the relay apparatus collects the distributed hash values respectively associated with the other apparatuses coupled to the communication path from the other apparatuses and transmits the distributed hash values to the authentication apparatus, and
wherein the apparatus authentication performed by the authentication apparatus includes a function to determine whether or not the relay apparatus and the other apparatuses are authentic apparatuses based on the distributed hash values.

5. The relay apparatus according to claim 1,
wherein the other apparatuses include another relay apparatus,
wherein the relay apparatus transmits its own authentication information to the authentication apparatus through the other relay apparatus,
wherein the relay apparatus collects authentication information from the other apparatuses except for the other relay apparatus and transmits the authentication information to the authentication apparatus through the other relay apparatus, and
wherein the relay apparatus receives a result of the apparatus authentication from the authentication apparatus through the other relay apparatus, shuts down communication between itself and an apparatus determined to be unauthentic based on the result, and transmits communication control information to the other apparatuses except for the other relay apparatus to shut down communication with the apparatus determined to be unauthentic.

6. The relay apparatus according to claim 1,
wherein the relay apparatus and the other apparatuses are electronic control units and the communication path is an in-vehicle network.

7. The relay apparatus according to claim 6,
wherein when it is found that there is an apparatus determined to be unauthentic as a result of the apparatus authentication, the relay apparatus has a function to ask a user of a vehicle, in which the in-vehicle network is mounted, whether or not to shut down communication with the apparatus determined to be unauthentic.

8. A terminal apparatus configured to communicate with an authentication apparatus through a relay apparatus and to be coupled to a communication path to which the relay apparatus and other apparatuses are coupled, the terminal apparatus comprising:
a central processing unit;
a memory storing unique authentication information for the terminal apparatus; and
an external interface configured for communication with the relay apparatus,
wherein the relay apparatus and the other apparatuses respectively have unique authentication information,
wherein the relay apparatus has a function to transmit its own authentication information to the authentication apparatus and a function to collect authentication information from the terminal apparatus and the other apparatuses which are coupled to the communication path and to transmit the authentication information to the authentication apparatus,
wherein the authentication apparatus has a function of apparatus authentication that determines whether or not the terminal apparatus, the relay apparatus, and the other apparatuses are authentic apparatuses based on the authentication information, and
wherein the terminal apparatus, upon being determined to be authentic by the authentication apparatus based on authentication information stored in the memory of the terminal apparatus, receives communication control information including identifiers for at least some of the other apparatuses from the relay apparatus and shuts down communication between itself and an apparatus determined to be unauthentic in response to receiving the communication control information, including the identifiers for at least some of the other apparatuses, from the relay apparatus.

9. The terminal apparatus according to claim 8,
wherein each of the terminal apparatus, the relay apparatus, and the other apparatuses has an identifier unique to each apparatus as the authentication information and a unique key which is shared with the authentication apparatus and is unique to each apparatus,
wherein the terminal apparatus performs mutual authentication with the relay apparatus before transmitting authentication information to the relay apparatus,
wherein the terminal apparatus transmits an identifier and a unique key, which are encrypted, to the relay apparatus,
wherein the relay apparatus transmits an identifier and a unique key, which are encrypted, to the authentication apparatus,
wherein the relay apparatus collects identifiers and unique keys, which are encrypted, respectively from the other apparatuses coupled to the communication path and transmits the identifier and unique key received from the terminal apparatus and the identifiers and unique keys collected from the other apparatuses to the authentication apparatus, and
wherein the apparatus authentication performed by the authentication apparatus includes a function to decrypt the encrypted identifiers and determine whether or not the terminal apparatus, the relay apparatus, and the other apparatuses are authentic apparatuses based on the decrypted identifiers.

10. The terminal apparatus according to claim 8,
wherein distributed hash values respectively associated with the terminal apparatus, the relay apparatus, and the other apparatuses as the authentication information are supplied to the terminal apparatus, the relay apparatus, and the other apparatuses, respectively,
wherein the terminal apparatus transmits the distributed hash value associated with itself to the relay apparatus,
wherein the relay apparatus transmits the distributed hash value associated with itself to the authentication apparatus,
wherein the relay apparatus collects the distributed hash values respectively associated with the other apparatuses coupled to the communication path from the other apparatuses, respectively, and transmits the distributed hash value received from the terminal apparatus and the distributed hash values collected from the other apparatuses to the authentication apparatus, and
wherein the apparatus authentication performed by the authentication apparatus includes a function to determine whether or not the terminal apparatus, the relay apparatus, and the other apparatuses are authentic apparatuses based on the distributed hash values.

11. The terminal apparatus according to claim 8,
wherein the terminal apparatus requests information that can be generated only by the authentication apparatus from the authentication apparatus through a relay apparatus or another apparatus which are directly coupled to the terminal apparatus at a time point when the terminal apparatus is coupled to the communication path,
wherein the apparatus authentication performed by the authentication apparatus determines whether or not the terminal apparatus is an authentic apparatus, generates the information that can be generated only by the authentication apparatus, and transmits the information to the terminal apparatus along a path through which the request is received, and
wherein the terminal apparatus determines an apparatus that does not relay the information that can be generated only by the authentication apparatus to be an unauthentic apparatus from among the relay apparatus and the other apparatus which are directly coupled to the terminal apparatus and shuts down communication with the apparatus that does not relay the information.

12. The terminal apparatus according to claim 8,
wherein the other apparatuses includes another relay apparatus,
wherein the relay apparatus transmits its own authentication information to the authentication apparatus through the other relay apparatus,
wherein the relay apparatus collects authentication information from the other apparatuses and the terminal apparatus except for the other relay apparatus and transmits the authentication information to the authentication apparatus through the other relay apparatus,
wherein the relay apparatus receives a result of the apparatus authentication from the authentication apparatus through the other relay apparatus, and
wherein the terminal apparatus shuts down communication between itself and an apparatus determined to be unauthentic based on the result of the apparatus authentication received by the relay apparatus.

13. The terminal apparatus according to claim 8,
wherein the terminal apparatus, the relay apparatus, and the other apparatuses are electronic control units and the communication path is an in-vehicle network.

14. The terminal apparatus according to claim 13,
wherein when it is found that there is an unauthentic apparatus as a result of the apparatus authentication, the terminal apparatus has a function to ask a user of a vehicle, in which the in-vehicle network is mounted, whether or not to shut down communication with the apparatus determined to be unauthentic.

15. A communication method between a relay apparatus, a terminal apparatus, and other apparatuses, which is performed through a communication path,
wherein the relay apparatus, the terminal apparatus, and the other apparatuses respectively have unique authentication information,
the method comprising:
the relay apparatus communicating with an authentication apparatus and transmitting its own authentication information to the authentication apparatus,
the relay apparatus collecting authentication information from the terminal apparatus and the other apparatuses which are coupled to the communication path and transmitting the authentication information to the authentication apparatus,
the authentication apparatus performing apparatus authentication to determine whether the relay apparatus, the terminal apparatus, and the other apparatuses are authentic apparatuses based on the authentication information,
the relay apparatus receiving a result of the apparatus authentication from the authentication apparatus, shutting down communication between itself and an apparatus determined to be unauthentic based on the result, and transmitting, to the terminal apparatus and the other apparatuses determined to be authentic from among the terminal apparatus and other apparatuses having the respective authentication information, communication control information including identifiers for at least some of the other apparatuses to shut down communication with the apparatus determined to be unauthentic, and
the terminal apparatus and the other apparatuses determined to be authentic shutting down communication between themselves and the apparatus determined to be unauthentic based on the communication control information including the identifiers for at least some of the other apparatuses.

16. The communication method according to claim 15,
wherein each of the terminal apparatus, the relay apparatus, and the other apparatuses has an identifier unique to each apparatus as the authentication information and a unique key which is shared with the authentication apparatus and is unique to each apparatus,
wherein the terminal apparatus performs mutual authentication with the relay apparatus before transmitting authentication information to the relay apparatus,
wherein the terminal apparatus transmits an identifier and a unique key, which are encrypted, to the relay apparatus,
wherein the relay apparatus transmits an identifier and a unique key, which are encrypted, to the authentication apparatus,
wherein the relay apparatus collects encrypted identifiers respectively from the other apparatuses coupled to the communication path and transmits the identifiers to the authentication apparatus,
wherein the relay apparatus collects encrypted identifiers respectively from the other apparatuses coupled to the communication path and transmits the identifier received from the terminal apparatus and the identifiers collected from the other apparatuses to the authentication apparatus, and
wherein the authentication apparatus decrypts the encrypted identifiers and determines whether or not the terminal apparatus, the relay apparatus, and the other apparatuses are authentic apparatuses based on the decrypted identifiers.

17. The communication method according to claim 15,
wherein distributed hash values respectively associated with the terminal apparatus, the relay apparatus, and the other apparatuses as the authentication information are supplied to the terminal apparatus, the relay apparatus, and the other apparatuses, respectively,
wherein the terminal apparatus transmits the distributed hash value associated with itself to the relay apparatus,
wherein the relay apparatus transmits the distributed hash value associated with itself to the authentication apparatus,
wherein the relay apparatus collects the distributed hash values respectively associated with the other apparatuses coupled to the communication path from the other apparatuses, respectively, and transmits the distributed hash value received from the terminal apparatus and the distributed hash values collected from the other apparatuses to the authentication apparatus, and wherein the authentication apparatus determines whether or not the terminal apparatus, the relay apparatus, and the other apparatuses are authentic apparatuses based on the distributed hash values.

18. The communication method according to claim 15, wherein the other apparatuses includes another relay apparatus, wherein the relay apparatus transmits its own authentication information to the authentication apparatus through the other relay apparatus, and wherein the relay apparatus collects authentication information from the other apparatuses and the terminal apparatus except for the other relay apparatus, transmits the collected authentication information to the authentication apparatus through the other relay apparatus, and receives a result of the apparatus authentication from the authentication apparatus through the other relay apparatus.

19. The communication method according to claim 15, wherein the terminal apparatus, the relay apparatus, and the other apparatuses are electronic control units and the communication path is an in-vehicle network.

20. The communication method according to claim 19, wherein when it is found that there is an unauthentic apparatus as a result of the apparatus authentication, the terminal apparatus or the relay apparatus ask a user of a vehicle, in which the in-vehicle network is mounted, whether or not to shut down communication with the apparatus determined to be unauthentic.

* * * * *